(12) United States Patent
Kitada

(10) Patent No.: US 9,282,045 B2
(45) Date of Patent: Mar. 8, 2016

(54) INFORMATION PROCESSING METHOD, INFORMATION PROCESSING CIRCUIT, AND INFORMATION PROCESSING APPARATUS

(71) Applicant: FUJITSU LIMITED, Kawasaki-shi, Kanagawa (JP)

(72) Inventor: Atsushi Kitada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/075,429

(22) Filed: Nov. 8, 2013

(65) Prior Publication Data

US 2014/0169175 A1 Jun. 19, 2014

(30) Foreign Application Priority Data

Dec. 19, 2012 (JP) ................. 2012-276594

(51) Int. Cl.
*H04J 1/16* (2006.01)
*H04L 12/803* (2013.01)

(52) U.S. Cl.
CPC .................................. *H04L 47/125* (2013.01)

(58) Field of Classification Search
None
See application file for complete search history.

(56) References Cited

U.S. PATENT DOCUMENTS

2005/0002334 A1* 1/2005 Chao et al. ............. 370/230
2007/0189283 A1* 8/2007 Agarwal ............. H04L 45/00
370/388
2008/0279195 A1* 11/2008 Okuno ............. 370/395.6

FOREIGN PATENT DOCUMENTS

JP 2001-136200 5/2001
JP 2008-236653 10/2008

* cited by examiner

*Primary Examiner* — Kibrom T Hailu
(74) *Attorney, Agent, or Firm* — Staas & Halsey LLP

(57) ABSTRACT

A method includes scheduling a packet to be transmitted to a second relay device instead of a first relay device, when a plurality of packets actually transmitted or to be transmitted under a rule, which causes the packets to dispersively pass through different relay devices when destination addresses of the packets are the same, are disproportionally transmitted to the first relay device, and the rule indicates that the packet is to be transmitted to the first relay device.

6 Claims, 18 Drawing Sheets

FIG. 7A

| DESTINATION ADDRESS (FOR EXAMPLE, OUTPUT CIRCUIT NO., [n]) | DESTINATION-ADDRESS-SPECIFIC COUNT VALUE |
|---|---|
| EG[0] | +1 |
| EG[1] | -2 |
| ... | ... |
| EG[4] | 0 |
| ... | ... |
| EG[n] | 0 |

FIG. 7B

| ENTIRE-TRANSMISSION-DATA COUNT VALUE |
|---|
| -4 |

FIG. 7C

| DESTINATION ADDRESS (FOR EXAMPLE, OUTPUT CIRCUIT NO., [n]) | RELAY CIRCUIT SELECTED (FOR EXAMPLE, SWITCH CIRCUIT NO. SW[n]) |
|---|---|
| EG[0] | FOR EXAMPLE, SELECT SW[0] AND SW[1] BY ROUND ROBIN |
| EG[1] | FOR EXAMPLE, SELECT SW[0] AND SW[1] BY ROUND ROBIN |
| ... | ... |
| EG[4] | FOR EXAMPLE, SELECT SW[0] AND SW[1] BY ROUND ROBIN |
| ... | ... |
| EG[n] | FOR EXAMPLE, SELECT SW[0] AND SW[1] BY ROUND ROBIN |

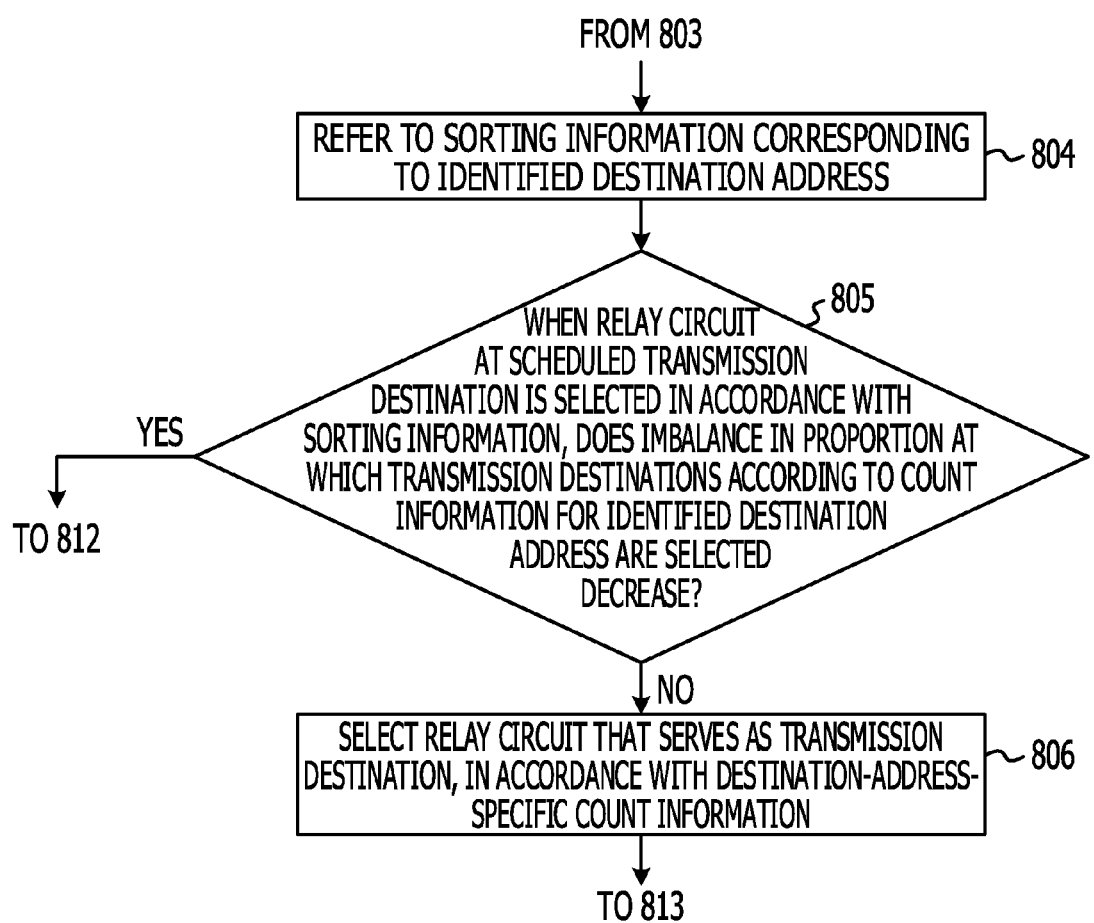

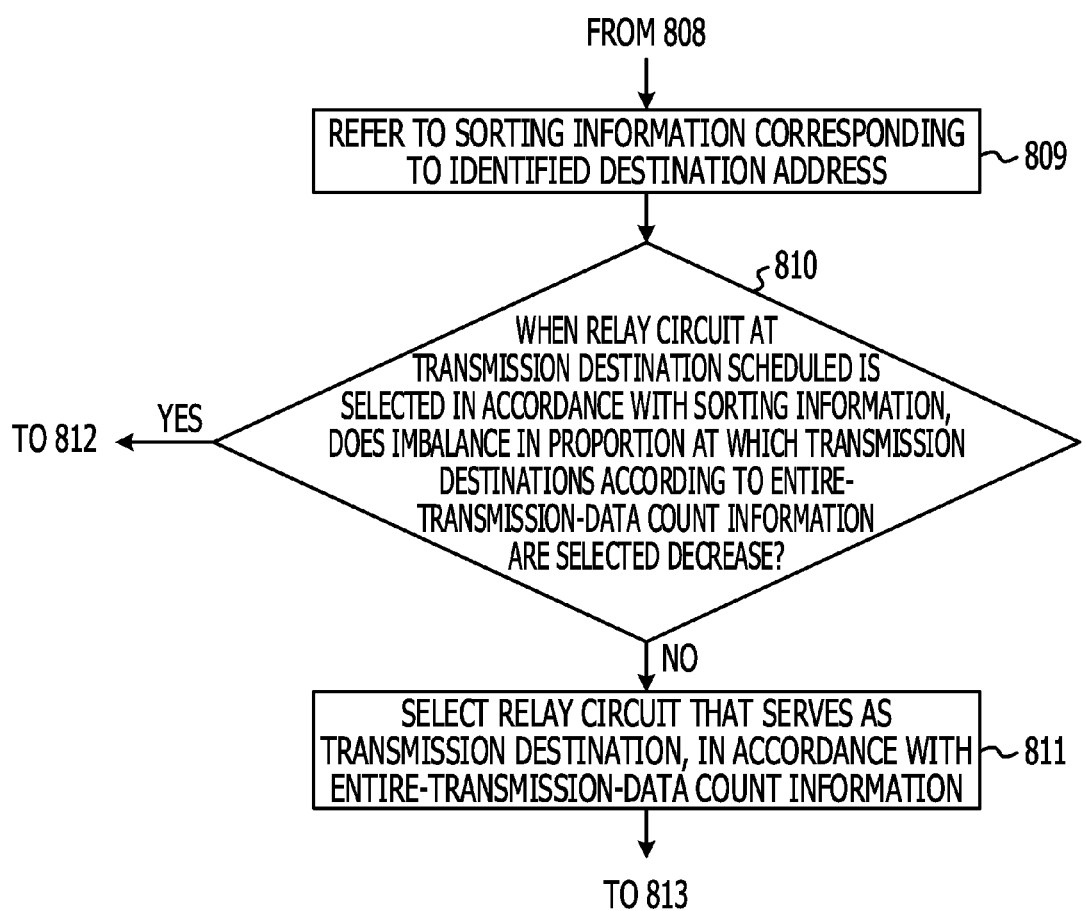

| ORDER OF INPUT DATA (SUCH AS PACKETS) | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| DESTINATION ADDRESS NO. (FOR EXAMPLE, EG[n]) | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| COUNT VALUE ASSOCIATED WITH DESTINATION-ADDRESS NO. DURING DETERMINATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ENTIRE-TRANSMISSION-DATA COUNT VALUE | -3 | 4 | -3 | -3 | -3 | -3 | -3 | -3 | -3 | -3 | -3 | -3 | -3 | -3 | -3 | -3 | 4 | -3 | 4 | -3 | 4 | -3 | -2 | 0 |
| RELAY CIRCUIT ASSOCIATED WITH DESTINATION ADDRESS NO. DURING DETERMINATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RELAY CIRCUIT NO. SELECTED (FOR EXAMPLE, SW[n]) | 0 | 1 | 0 | 0 | 0 | 1 | 0 | 1 | 0 | 1 | 1 | 1 | 1 | 1 | 1 | 1 | 1 | 0 | 1 | 0 | 1 | 0 | 0 | 0 |

FIG. 10A

| DESTINATION ADDRESS (FOR EXAMPLE, OUTPUT CIRCUIT NO., [n]) | DESTINATION-ADDRESS-SPECIFIC COUNT VALUE |
|---|---|
| EG[0] | -1 |
| EG[1] | -1 |
| ... | ... |
| EG[4] | 0 → +1 |
| ... | ... |
| EG[23] | 0 |

FIG. 10B

| ENTIRE-TRANSMISSION-DATA COUNT VALUE |
|---|
| -4 → -3 |

FIG. 10C

| DESTINATION ADDRESS (FOR EXAMPLE, OUTPUT CIRCUIT NO., [n]) | RELAY CIRCUIT SELECTED (FOR EXAMPLE, SWITCH CIRCUIT NO. SW[n]) |
|---|---|
| EG[0] | SW[1] |
| EG[1] | SW[1] |
| ... | ... |
| EG[4] | SW[0] → SW[0] |
| ... | ... |
| EG[23] | SW[0] |

FIG. 12A

| ENTIRE-TRANSMISSION-DATA COUNT VALUE |
|---|
| -4 → -3 |

FIG. 12B

| DESTINATION ADDRESS NO. (FOR EXAMPLE, EG[n]) | RELAY CIRCUIT SELECTED (FOR EXAMPLE, SWITCH CIRCUIT NO., SW[n]) |
|---|---|
| EG[0] | SW[0] → SW[0] |
| EG[1] | SW[1] |
| ... | ... |
| EG[4] | SW[0] |
| ... | |
| EG[23] | SW[0] |

| ORDER OF INPUT DATA | 24 | 23 | 22 | 21 | 20 | 19 | 18 | 17 | 16 | 25 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| DESTINATION ADDRESS NO. (FOR EXAMPLE, EG[n]) | 13 | 0 | 12 | 0 | 11 | 0 | 10 | 0 | 9 | 0 | 8 | 0 | 7 | 0 | 6 | 0 | 5 | 0 | 4 | 0 | 3 | 2 | 1 | 0 |
| COUNT VALUE ASSOCIATED WITH DESTINATION ADDRESS NO. DURING DETERMINATION | 0 | +2 | 0 | +1 | 0 | +2 | 0 | +1 | 0 | +2 | 0 | +1 | 0 | +2 | 0 | +1 | 0 | 0 | 0 | 0 | 0 | 0 | 0 | 0 |
| ENTIRE-TRANSMISSION-DATA COUNT VALUE | -5 | -4 | -3 | -4 | -5 | -4 | -3 | -4 | -5 | -4 | -5 | -4 | -5 | -4 | -3 | -4 | -3 | -4 | -3 | -4 | -3 | -2 | -1 | 0 |
| RELAY CIRCUIT ASSOCIATED WITH DESTINATION ADDRESS NO. DURING DETERMINATION | 0 | 0 | 0 | 1 | 0 | 1 | 0 | 1 | 0 | 1 | 0 | 1 | 0 | 1 | 0 | 1 | 0 | 0 | 0 | 0 | 0 | 0 | 0 | 0 |
| RELAY CIRCUIT NO. SELECTED (FOR EXAMPLE, SW[n]) | 1 | 0 | 0 | 1 | 1 | 1 | 0 | 1 | 1 | 1 | 0 | 1 | 1 | 1 | 0 | 1 | 1 | 0 | 1 | 0 | 0 | 0 | 0 | 0 |

FIG. 14A

| DESTINATION ADDRESS (FOR EXAMPLE, OUTPUT CIRCUIT NO., [n]) | DESTINATION-ADDRESS-SPECIFIC COUNT VALUE |
|---|---|
| EG[0] | +2 → +1 |
| EG[1] | -1 |
| ... | ... |
| EG[4] | -1 |
| ... | ... |
| EG[23] | 0 |

FIG. 14B

| ENTIRE-TRANSMISSION-DATA COUNT VALUE |
|---|
| -4 → -5 |

FIG. 14C

| DESTINATION ADDRESS (FOR EXAMPLE, OUTPUT CIRCUIT NO., [n]) | RELAY CIRCUIT SELECTED (FOR EXAMPLE, SWITCH CIRCUIT NO. SW[n]) |
|---|---|
| EG[0] | SE[0] → SW[1] |
| EG[1] | SW[1] |
| ... | ... |
| EG[4] | SW[1] |
| ... | ... |
| EG[23] | SW[0] |

INFORMATION PROCESSING METHOD, INFORMATION PROCESSING CIRCUIT, AND INFORMATION PROCESSING APPARATUS

CROSS-REFERENCE TO RELATED APPLICATION

This application is based upon and claims the benefit of priority from the prior Japanese Patent Application No. 2012-276594 filed on Dec. 19, 2012, the entire contents of which are incorporated herein by reference.

FIELD

The embodiment discussed herein is related to an information processing method, an information processing circuit, and an information processing apparatus.

BACKGROUND

There are schedulers for achieving equalizing transfer qualities of packets between connections during packet switching. For example, Japanese Laid-open Patent Publication No. 2001-136200 discloses a scheduler that calculates a packet allocation history load for each group of destination addresses during determination of transfer routes of packets. When there are multiple routes with which the packet allocation history load is minimized, the schedule selects those routes with equal probability to set them as the transfer routes of the packets.

SUMMARY

According to an aspect of the invention, a method includes scheduling a packet to be transmitted to a second relay device instead of a first relay device, when a plurality of packets actually transmitted or to be transmitted under a rule, which causes the packets to dispersively pass through different relay devices when destination addresses of the packets are the same, are disproportionally transmitted to the first relay device, and the rule indicates that the packet is to be transmitted to the first relay device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A to 7C illustrate an example of information for use in the information processing apparatus and the information processing circuit;

FIGS. 8A to 8C illustrate an example of the processing executed by the information processing apparatus or the information processing circuit according to the embodiment;

FIGS. 10A to 10C illustrate an example of information updated in the processing performed by the information processing apparatus or the information processing circuit according to the embodiment;

FIGS. 12A and 12B illustrate an example of information updated in connection with the other communication example;

FIGS. 14A to 14C illustrate another example of information updated by the processing performed by the communication apparatus or the communication circuit according to the embodiment;

DESCRIPTION OF EMBODIMENT

According to study by the present inventor, when plurality of packets having different destination addresses are transmitted under a given rule that causes packets having the same destination address to pass through different relay circuits, there are cases in which plurality of packets having different destination addresses are disproportionately transmitted to a particular relay circuit.

According to an embodiment described below, it is possible to reduce packets that are disproportionately transmitted to a particular relay circuit.

Figure 1:
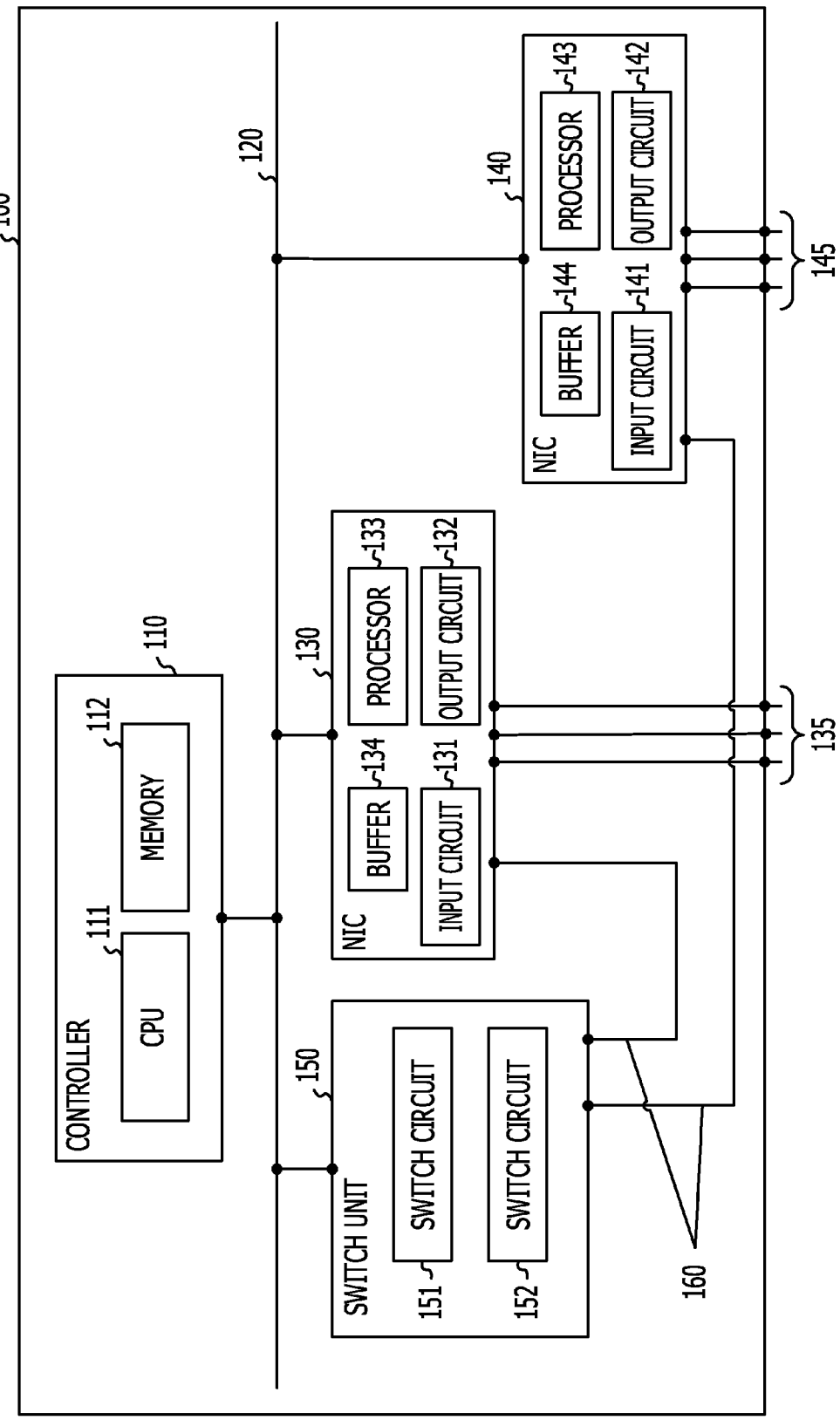
FIG. 1 illustrates an example of an information processing apparatus and an information processing circuit according to an embodiment.

FIG. 1 illustrates an example of an information processing apparatus and an information processing circuit according to an embodiment. A communication apparatus 100, which is an example of the information processing apparatus according to the embodiment, includes a controller 110, a bus 120, network interface cards (NICs) 130 and 140, a switch unit 150, and signal lines 160. The controller 110 has a central processing unit (CPU) 111 and a memory 112 and is coupled to the bus 120. The NICs 130 and 140 and the switch unit 150 are coupled to the bus 120. The communication apparatus 100 can be used as an apparatus for processing packets and so on for, for example, a router and a bridge, in a network.

A program for executing various types of processing in the communication apparatus 100 is stored in the memory 112, and the CPU 111 reads the program from the memory 112 and executes the various types of processing. In accordance with the various types of processing executed by the CPU 111, operations of the NICs 130 and 140 and the switch unit 150 are controlled through the bus 120. The program stored in the memory 112 may be a program read thereinto from a nonvolatile memory, such as a read only memory (ROM) or a flash memory, or a magnetic disk device, such as a hard disk drive (HDD).

The CPU 111 may include one or more CPU cores for executing the various types of processing. Each CPU core may also include one or more processors. The memory 112 is, for example, a random access memory (RAM), such as a dynamic random access memory (DRAM).

The NIC 130 includes an input circuit 131, an output circuit 132, a processor 133, and a buffer 134. The input circuit 131 serves to input packets, such as packets, to the NIC 130, and the output circuit 132 serves to output packets, such as packets, from the NIC 130. The NIC 130 is coupled to an external apparatus, coupled external to the communication apparatus 100, through physical ports and signal lines 135. Each of the number of input circuits 131 and the number of output circuits 132 included in the NIC 130 may be one or more in accordance with the number of physical ports, the number of signal lines 135, and the configuration thereof. Each of the input circuit 131 and the output circuit 132 may include a termination circuit, a level shift circuit, and so on as its hardware configuration. On the other hand, the NIC 140 includes an input circuit 141, an output circuit 142, a processor 143, and a buffer 144. The input circuit 141 serves to input packets, such as packets, to the NIC 140, and the output circuit 142 serves to output packets, such as packets, from the NIC 140. The NIC 140 is coupled to an external apparatus, coupled external to the communication apparatus 100, through physical ports and signal lines 145. Each of the number of input circuits 141 and the number of output circuits 142 included in the NIC 140 may be one or more in accordance with the number of physical ports, the number of signal lines 145, and the configuration thereof. Each of the input circuit 141 and the output circuit 142 may include a termination circuit, a level shift circuit, and so on as its hardware configuration.

Each of the input circuits 131 and 141 respectively included in the NICs 130 and 140 serves as a communication circuit and corresponds to an example of the information processing circuit. The communication apparatus 100 according to the embodiment is not limited to the number of NICs 130, the number of NICs 140, and the configuration thereof, and so on.

The NICs 130 and 140 are coupled to the switch unit 150 through the corresponding signal lines 160. For example, packets, such as packets, are input from outside of the communication apparatus 100 to the NIC 130 through the corresponding physical port and the signal line 135, are sent out from the input circuit 131 to the signal line 160, and are then sent to a switch circuit 151 or 152, included in the switch unit 150, through the signal line 160. Each of the switch circuits 151 and 152 determines, for example, whether or not the NIC 140 is a transmission destination, based on information of a transmission destination contained in a header of a transmitted packet or the like, and upon determining that the NIC 140 is a transmission destination, the corresponding one of the switch circuits 151 and 152 transmits the packet or the like to the output circuit 142 in the NIC 140 through the signal line 160. In accordance with the information regarding the transmission destination of the packet, the output circuit 142 transmits the packet or the like through the physical port and the signal line 145. In the communication apparatus 100, each of the number of switch circuits 151 and the number of switch circuits 152 included in the switch unit 150 is not limited to one and may be any number larger than or equal to one. The switch circuits 151 and 152 execute switching for distributing load of packet transmission in the communication apparatus 100, as described below.

With the hardware configuration illustrated in FIG. 1, the information processing apparatus and the information processing circuit according to the embodiment serve as functional blocks described below to execute processing described below.

Figure 2:
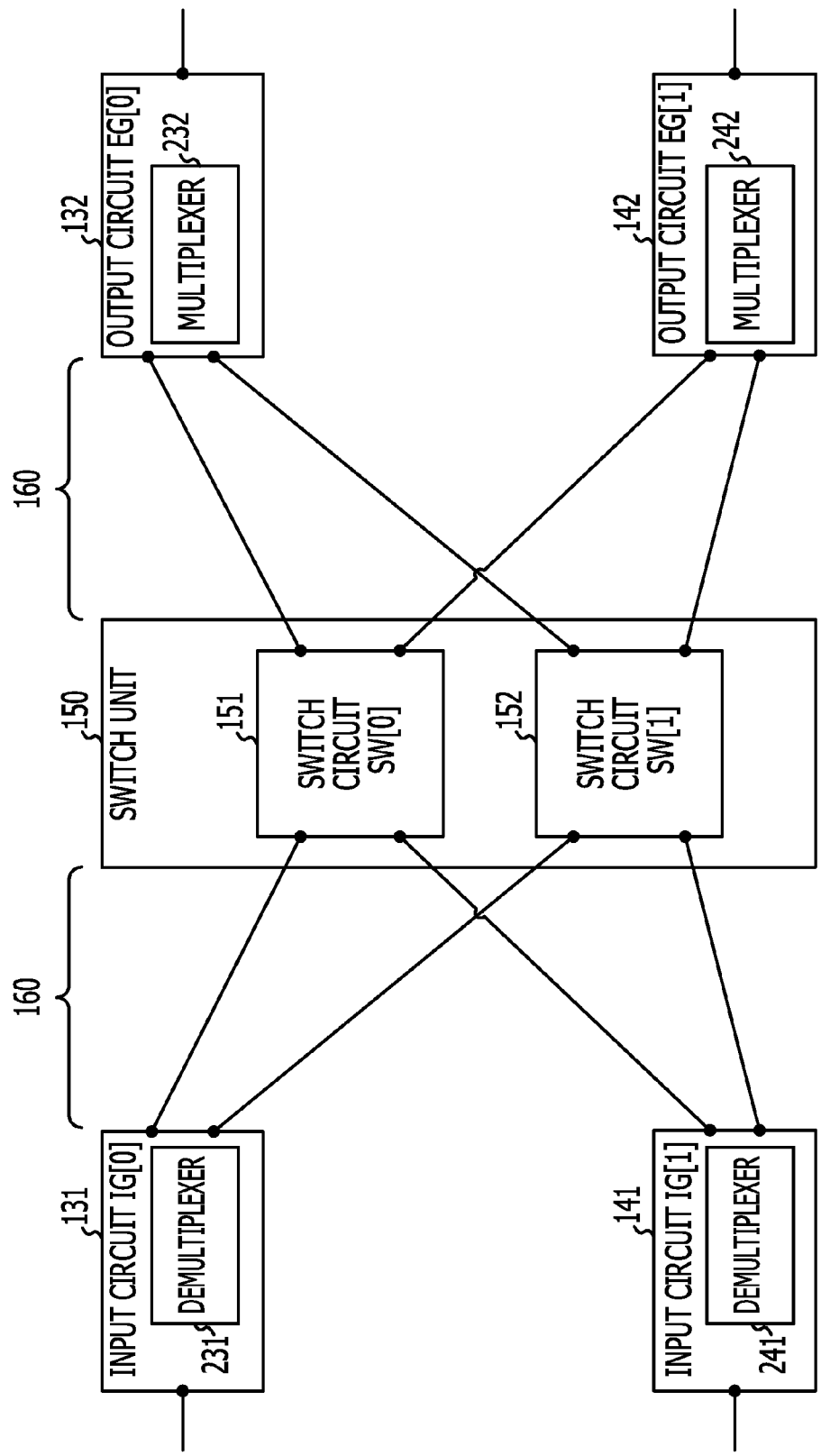
FIG. 2 illustrates an example of the information processing circuit and switch circuits according to the embodiment.

FIG. 2 illustrates an example of the information processing circuit and the switch circuits 151 and 152 according to the embodiment. FIG. 2 illustrates a relationship in which the input circuit 131, the output circuit 132, the input circuit 141, the output circuit 142, and the switch circuits 151 and 152 are coupled through the signal lines 160 illustrated in FIG. 1. The input circuit 131 includes a demultiplexer 231, the output circuit 132 includes a multiplexer 232, the input circuit 141 includes a demultiplexer 241, and the output circuit 142 includes a multiplexer 242. For convenience of description, the nth input circuit is indicated by IG[n], the nth output circuit is indicated by EG[n], and the nth switch circuit is indicated by SW[n]. For example, the input circuit 131 is indicated by IG[0], the output circuit 132 is indicated by EG[0], the input circuit 141 is indicated by IG[1], the output circuit 142 is indicated by EG[1], the switch circuit 151 is indicated by SW[0], and the switch circuit 152 is indicated by SW[1]. The configuration in which two input circuits 131 and 141 and two output circuits 132 and 142 are provided is merely exemplary, and the embodiment is not limited thereto. The number of input circuits and the number of output circuits may also be different from each other.

For example, when packets, such as a packet, is input to IG[0], either SW[0] or SW[1] is selected as the transmission destination thereof by the demultiplexer 231, so that the packets is transmitted to the selected switch circuit SW[0] or SW[1] through the corresponding signal line 160. For example, when packets, such as a packet, is transmitted to SW[0], SW[0] transmits the packets, such as the packet, to EG[0] or EG[1] corresponding to a destination address through the signal line 160 in accordance with destination-address information contained in the header in the packet or the like.

Through the use of the multiple switch circuits SW[0] and SW[1] in the manner described above, load distribution of communication in the communication apparatus 100 is executed, so that high-speed switching can be performed. For example, even when the signal lines for inputting packets to IG[0] permit a bandwidth of 10 Gbps, 40 Gbps, 100 Gbps, or larger, the plurality of switch circuits SW[0] and SW[1] select one of the output circuits EG[0] and EG[1] while checking the transfer-destination address of each packet by referring to the contents of the packet. Consequently, the load on the switch circuits SW[0] and SW[1] is large. In this case, distributing packets to the multiple switch circuits SW[0] and SW[1] allows the switch circuits SW[0] and SW[1] to operate in a parallel manner, thereby making it possible to achieve a high-speed communication. For example, for specifications stipulating that each of the signal lines for packets input to IG[0] is 1 Gbps and 48 input ports are provided, the maximum rate of communication input to IG[0] is 48 Gbps, and in this case, executing parallel communication to distribute packets to multiple switch circuits makes it possible to achieve high-speed communication. For example, in a case in which the signal lines for inputting packets to IG[0] permit a bandwidth of 10 Gbps, even when the permissible bandwidths of the signal line 160 between IG[0] and SW[0] and the signal line 160 between IG[0] and SW[1] are each 5 Gbps, sorting the packets to the multiple switch circuits SW[0] and SW[1] makes it possible to perform communication at 10 Gbps in the communication apparatus 100. The packets sorted in this manner are transmitted from the multiple switch circuits SW[0] and SW[1] to the output circuits EG[0] or EG[1] in a parallel manner in accordance with the destination addresses of the packets and are multiplexed by EG[0] or EG[1], and the multiplexed packets are output from the communication apparatus 100.

As described above, changing the number of switch circuits in the communication apparatus 100 makes it possible to change the bandwidth that is permissible in the communication apparatus 100. When the number of switch circuits is increased, the bandwidth that is permissible in the communication apparatus 100 can be increased based on the relationship between the number of switch circuits and the permissible bandwidth of the signal lines 160. In contrast, when the number of switch circuits is reduced, this means that the bandwidth that is permissible in the communication apparatus 100 decreases. However, the circuit scale of the communication apparatus 100 can be reduced by an amount corresponding to the reduction in the number of switch circuits. In such a manner, reducing the number of switch circuits makes it possible to perform highly efficient switching depending on the intended use.

The selection of SW[0] or SW[1] may be executed by the processor 133 or 143 illustrated in FIG. 1, and packets or the like to be transmitted may be temporarily stored in the buffer 134 or 144 in order to schedule the packets or the like to be transmitted to SW[0] or SW[1]. When packets is divided according to units of processing in the communication apparatus 100, packets, such as packets, transmitted to SW[0] or SW[1] may have a different packets size from that of packets received by the communication apparatus 100.

Figure 3:
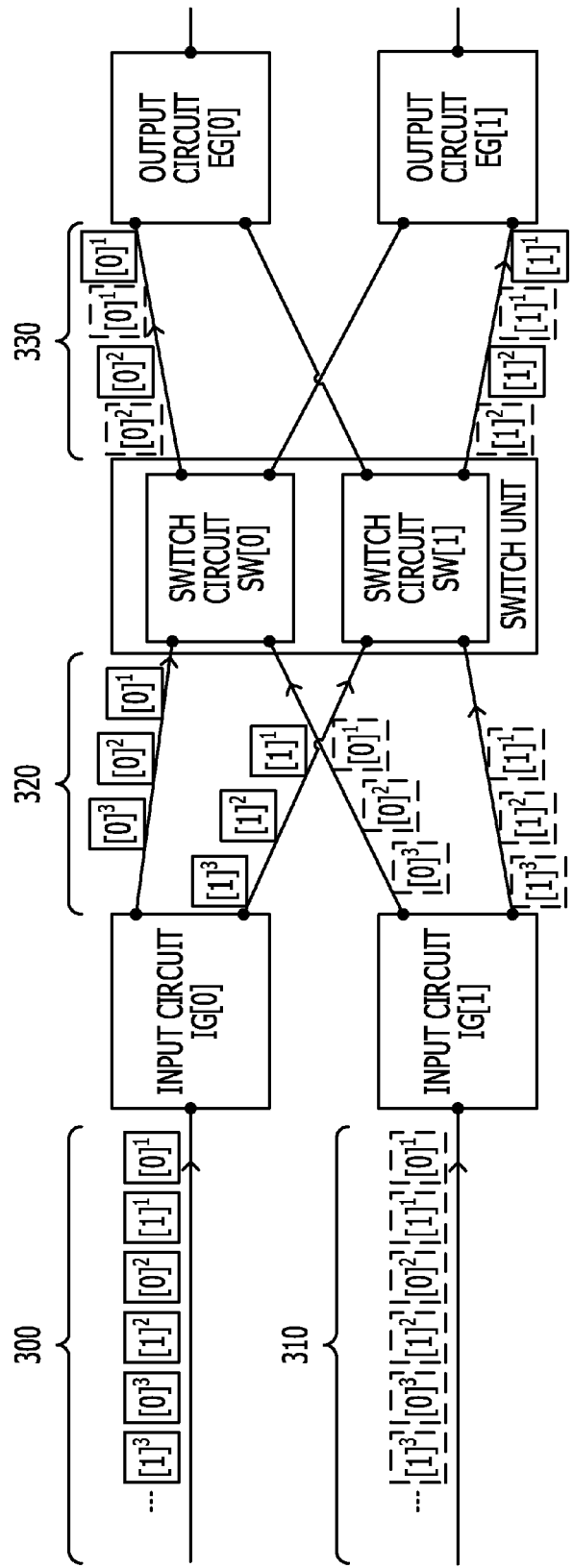
FIG. 3 illustrates an example of plurality of transmission packets to be switched.

FIG. 3 illustrates an example of plurality of transmission packets to be switched. It is assumed that IG[0], EG[0], IG[1], EG[1], SW[0], and SW[1] illustrated in FIG. 3 are coupled to each other through signal lines to have a connection relationship like that illustrated in FIG. 2. Although a description below will be given of a case in which packets input to IG[0] and IG[1] are packets, the packets may be divided into processing units in the communication apparatus 100. Hereinafter, when the output circuit serving as the destination address of a packet is EG[0], the packet is denoted as [0], and when the output circuit serving as the destination address of a packet is EG[1], the packet is denoted as [1]. With respect to the packets [0] input to IG[0] or IG[1], the order of input is denoted by superscripts. For example, the first packet input to IG[0] is denoted as $[0]^1$, and the second packet input to IG[0] is denoted as $[0]^2$. In addition, as illustrated in FIG. 3, the packets input to IG[0] are denoted as solid-line squares, and the packets input to IG[1] are denoted as dotted-line squares.

It is assumed that the packets having the destination addresses EG[0] and EG[1] are alternately input to IG[0] at a communication rate of 5 Gbps, that is, are input thereto at a total communication rate of 10 Gbps. These packets are denoted as $[0]^1, [1]^1, [0]^2, [1]^2, [0]^3, [1]^3, \ldots$ in solid-line squares in section 300 in FIG. 3. It is also assumed that the packets having the destination addresses EG[0] and EG[1] are alternately input to IG[1] at a communication rate of 5 Gbps, that is, are input thereto at a total communication rate of 10 Gbps. These packets are denoted as $[0]^1, [1]^1, [0]^2, [1]^2, [0]^3, [1]^3, \ldots$ in dotted-line squares in section 310 in FIG. 3. The signal line that couples IG[0] and SW[0] and the signal line that couples IG[0] and SW[1] are each assumed to permit a bandwidth of up to 5 Gbps. Similarly, the signal line between IG[1] and SW[0], the signal line between IG[1] and SW[1], the signal line between EG[0] and SW[0], the signal line between SW[0] and SW[1], the signal line between EG[1] and SW[0], and the signal line between EG[1] and SW[1] are also each assumed to permit a bandwidth of up to 5 Gbps.

It is assumed that the packets input to IG[0] are alternately transmitted to SW[0] and SW[1] through alternate selection of SW[0] and SW[1] as the transmission destinations for load distribution. In this case, the packets $[0]^1, [1]^1, [0]^2, [1]^2, [0]^3, [1]^3, \ldots$ input to IG[0] are alternately sorted to SW[0] and SW[1]. As a result, as illustrated in section 320, the packets $[0]^1, [0]^2, [0]^3, \ldots$ denoted as solid lines are transmitted from IG[0] to SW[0], and the packets $[1]^1, [1]^2, [1]^3, \ldots$ denoted as solid lines are transmitted from IG[0] to SW[1]. On the other hand, packets input to IG[1] are also alternately transmitted to SW[0] and SW[1] through alternate selection of SW[0] and SW[1] as the transmission destinations for load distribution. In this case, the packets $[0]^1, [1]^1, [0]^2, [1]^2, [0]^3, [1]^3, \ldots$ input to IG[1] are alternately sorted to SW[0] and SW[1]. As a result, as illustrated in section 320, the packets $[0]^1, [0]^2, [0]^3, \ldots$ denoted as dotted lines are transmitted from IG[0] to SW[0], and the packets $[1]^1, [1]^2, [1]^3, \ldots$ denoted as dotted lines are transmitted from IG[1] to SW[1].

As described above, the packets $[0]^1, [0]^2, [0]^3, \ldots$ denoted as the solid lines and the packets $[0]^1, [0]^2, [0]^3, \ldots$ denoted as the dotted lines, the packets being transmitted to SW[0], are sequentially transmitted from SW[0] to EG[0] serving as the destination addresses. Consequently, congestion occurs in the signal line between SW[0] and EG[0]. The reason is that, although the bandwidth of the signal line between SW[0] and EG[0] is 5 Gbps as described above, the communication rate of the packets $[0]^1, [0]^2, [0]^3, \ldots$ denoted as the solid lines is 5 Gbps, the communication rate of the packets $[0]^1, [0]^2, [0]^3, \ldots$ denoted as the dotted lines is 5 Gbps, and thus a communication rate at 10 Gbps, which is the total of those communication rates, occurs between SW[0] and EG[0]. In practice, the communication rate of the packets transmitted from SW[0] to EG[0] is limited to 5 Gbps, which is the bandwidth of the signal line, and thus the desired throughput is not obtained. In this case, as illustrated in FIG. 3, although the communication path between SW[1] and EG[0] is available as a communication path to EG[0], no packets flow to this communication path, meaning that load distribution is not efficiently performed. Such an inefficient communication state also occurs in the communication of the packets having the destination address EG[1].

As described above with reference to FIG. 3, even packets between multiple input circuits and multiple switch circuits are seemingly sorted in a distributed manner, packets having a particular destination address may be disproportionately transmitted to a particular one of the switch circuits, depending on the relationship between the order of packets input to the multiple input circuits and the order of selection of the multiple switch circuits. Thus, communication is disproportionately performed through a particular one of the signal lines between the multiple switch circuits and the multiple output circuits. Consequently, although a signal line that is not used for communication is available between the multiple switch circuits and the multiple output circuits, the throughput of the communication is limited to the permissible bandwidth of the particular signal line. In this case, communication load distribution using the multiple switch circuits is not efficiently executed.

FIGS. 4A and 4B illustrate another example of plurality of transmission packets to be switched. It is assumed that IG[0], EG[0], IG[1], EG[1], SW[0], and SW[1] illustrated in FIG. 4A are coupled to each other through signal lines to have a connection relationship like that illustrated in FIG. 2. FIG. 4B illustrates information that IG[0] and IG[1] refer to in order to select a switch circuit during transmission of packets.

Figure 4:
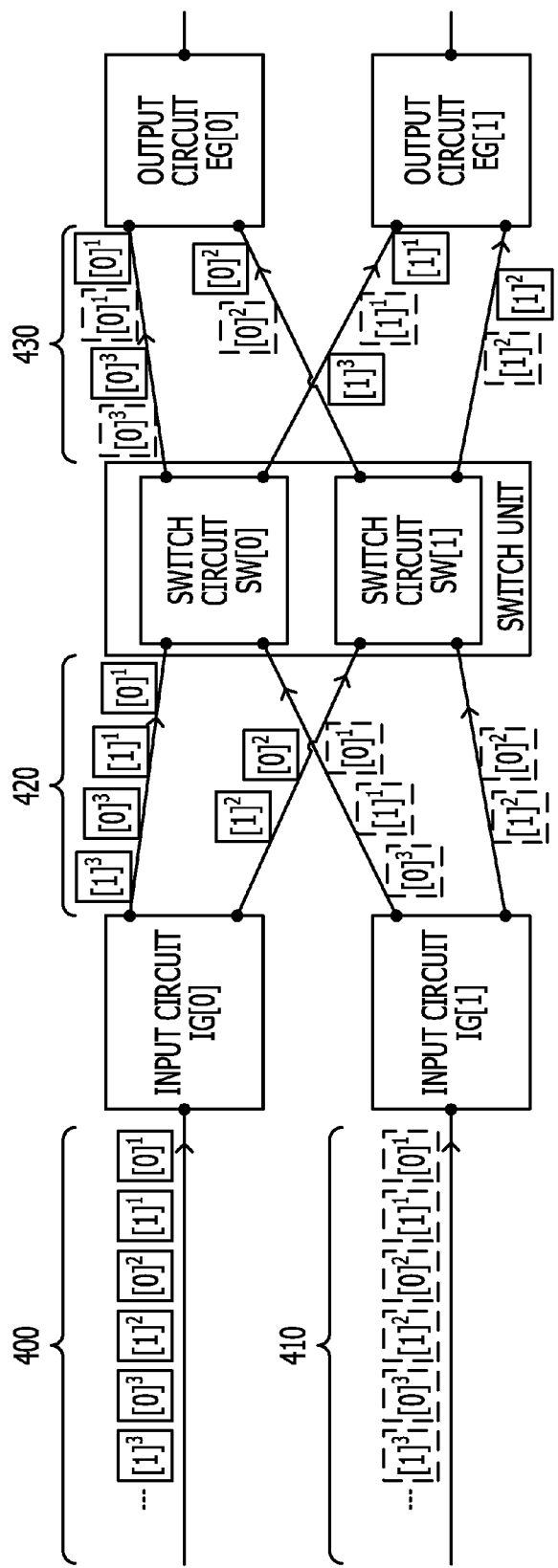
FIGS. 4A and 4B illustrate another example of plurality of transmission packets to be switched.

As illustrated in FIG. 4A, packets having the destination addresses EG[0] and EG[1] are alternately input to IG[0] at a communication rate of 5 Gbps, that is, are input thereto at a total communication rate of 10 Gbps, and these packets are denoted as $[0]^1$, $[1]^1$, $[0]^2$, $[1]^2$, $[0]^3$, $[1]^3$, ... in solid-line squares in section 400 in FIG. 4. In addition, packets having the destination addresses EG[0] and EG[1] are alternately input to IG[1] at a communication rate of 5 Gbps, that is, are input thereto at a total communication rate of 10 Gbps, and these packets are denoted as $[0]^1$, $[1]^1$, $[0]^2$, $[1]^2$, $[0]^3$, $[1]^3$, ... in dotted-line squares in section 410 in FIG. 4. The signal line that couples IG[0] and SW[0] and the signal line that couples IG[0] and SW[1] are each assumed to permit a bandwidth of up to 5 Gbps.

In the information illustrated in FIG. 4B, destination address numbers (Nos.) corresponding to EG[n] and the switch circuits SW[n] to be selected are associated with each other. Packets input to IG[0] are transmitted to SW[0] or SW[1] in accordance with the information illustrated in FIG. 4B for load distribution. For example, when SW[0] is associated with EG[0], a packet having the destination address EG[0] is transmitted from IG[0] to SW[0]. Thereafter, when a packet having the destination address EG[0] is transmitted from IG[0] to SW[0], the switch circuit associated with EG[0] is updated to SW[1] in the information illustrated in FIG. 4B. When the transmission destinations of packets having the same destination address are selected in accordance with the information illustrated in FIG. 4B, different switch circuits are sequentially selected as the transmission destinations. As such a packet-sorting rule, it is sufficient to ensure that packets having the same destination address are not continuously transmitted to different switch circuits. Accordingly, the switch circuits to be selected may be changed by applying a round robin system to each destination address or the switch circuits to be selected may be randomly changed for each destination address to ensure that the multiple switch circuits are selected for each destination address with equal probability. The packet sorting at IG[1] is also executed in substantially the same manner as the packet sorting at IG[0], and thus a description thereof is omitted.

Since SW[0] or SW[1] is selected in accordance with the information illustrated in FIG. 4B, for example, the packet $[0]^1$ having the destination address EG[0] is transmitted from IG[0] to SW[0], as illustrated in section 420, so that the packet $[0]^2$ having the destination address EG[0] is transmitted from IG[0] to SW[1], unlike the case illustrated in section 320 in FIG. 3. Thus, the packet $[0]^1$ is transmitted from SW[0] to EG[0] and the packet $[0]^2$ is transmitted from SW[1] to EG[0] in section 430, unlike in section 330 in FIG. 3, that is, unlike the case in which the packets $[0]^1$ and $[0]^2$ are both transmitted from SW[0] to EG[0]. Thus, unlike the case in FIG. 3, the proportions at which the communication paths are selected are equalized not only between the input circuits IG[0] and IG[1] and the switches SW[0] and SW[1] but also between the switch circuits SW[0] and SW[1] and the output circuits EG[0] and EG[1]. That is, the packet is dispersively transmitted to be balanced, resulting in efficient execution of load distribution in communication.

FIGS. 5A and 5B illustrate another example of plurality of transmission packets to be switched. The configuration illustrated in FIG. 5A has substantially the same connection relationship as that illustrated in FIG. 2, and is an example of a case in which n input circuits IG[n] and n output circuits EG[n] (n is 2 or greater) are coupled to switch circuits SW[0] and SW[1]. In FIG. 5A, some of IG[n] and EG[n] are not illustrated. FIG. 5B illustrates information that IG[0] and IG[1] refer to in order to select switch circuits during transmission of packets, some of the information being the same as the information illustrated in FIG. 4B.

Suppose that, as illustrated in section 500 in FIG. 5A, packets $[0]^1$, $[1]^1$, ..., and $[n]^1$ are input to IG[0] and then packets $[0]^2$, $[1]^2$, ..., and $[n]^2$ are input thereto, for example. In this case, in addition, suppose a case in which IG[0] attempts to select any of the n switch circuits to sort those packets in accordance with the information illustrated in FIG. 5B. For example, when the switch circuits associated with each destination address are assumed to be the same in FIG. 5B under a situation in which a round robin system is applied to each destination address, the n packets are continuously transmitted to a particular one of the switch circuits, as illustrated in section 520. For example, although the destination addresses of the packets $[0]^1$, $[1]^1$, ..., and $[n]^1$ are different from one another, the n packets are continuously transmitted to SW[0] when the switch circuits selected in accordance with the round robin system applied to the respective destination addresses are the same switch circuit SW[0]. In this case, when the packets $[0]^1$, $[1]^1$, ..., and $[n]^1$ are continuously transmitted to SW[0] at a communication rate that is higher than or equal to the permissible rate of the signal line between IG[0] and SW[0], a high communication rate occurs locally and thus congestion occurs. Taking into account the occurrence of such a local communication imbalance, redundant buffers for temporarily storing packets that are continuously transmitted may be provided in the switch circuits or a back pressure may be applied from the switch circuits to the input circuits so as to stop transmission of the packets or so as to discard the packets when a transmission state in which no more packets can be stored in the redundant buffers is reached. Such an arrangement, however, has some drawbacks. For example, the provision of redundant buffers increases the circuit scale, and applying a back pressure and discarding packets reduce the communication efficiency.

Such a local communication imbalance occurs when the switch circuits selected for the respective destination addresses of input packets become the same switch circuit with respect to the order of the destination addresses of the packets. Thus, when the number of selectable switch circuits is relatively small, a local communication imbalance is even more likely to occur. For example, when the number of switch circuits SW[n] is small relative to the number of output circuits EG[n] that serve as destination addresses, the number of switch circuits selectable for different destination addresses is small. Consequently, localized communication, that is, communication in which packets having different destination addresses are continuously transmitted to a particular one of the switch circuits, is more likely occur. This situation becomes even more prominent in applications such as that described above in which the circuit scale of the communication apparatus 100 is reduced through a reduction in the number of switch circuits. For example, an increase in the number of switch circuits SW[n] in order to reduce the circuit scale increases the possibility that the switch circuits selected for each destination address become the same switch circuit continuously. This results in continuous transmission of packets that may exceed a buffer size for absorbing localized communication. Accordingly, an increase in the sizes of the redundant buffers in order to absorb localized communication contradicts the aim of reducing the circuit scale.

In the following embodiment, in order to ensure that plurality of packets to be transmitted to different destination addresses under a given rule that causes plurality of packets having the same destination address to pass through different relay circuits are not disproportionately transmitted to a particular one of the relay circuits, packets scheduled to be transmitted are transmitted to another relay circuit. This suppresses disproportionate transmission of packets to a particular one of the relay circuits. For example, continuous transmission of packets to a particular one of the relay circuits is suppressed. The "relay circuits" as used herein refers to, for example, relay circuits for relaying packets or packets formatted in processing units, and encompasses, for example, switch circuits that change routes for destination addresses and processing circuits for executing given processing on packets or packets formatted in processing units and then relaying the resulting packets or the like.

Figure 6:
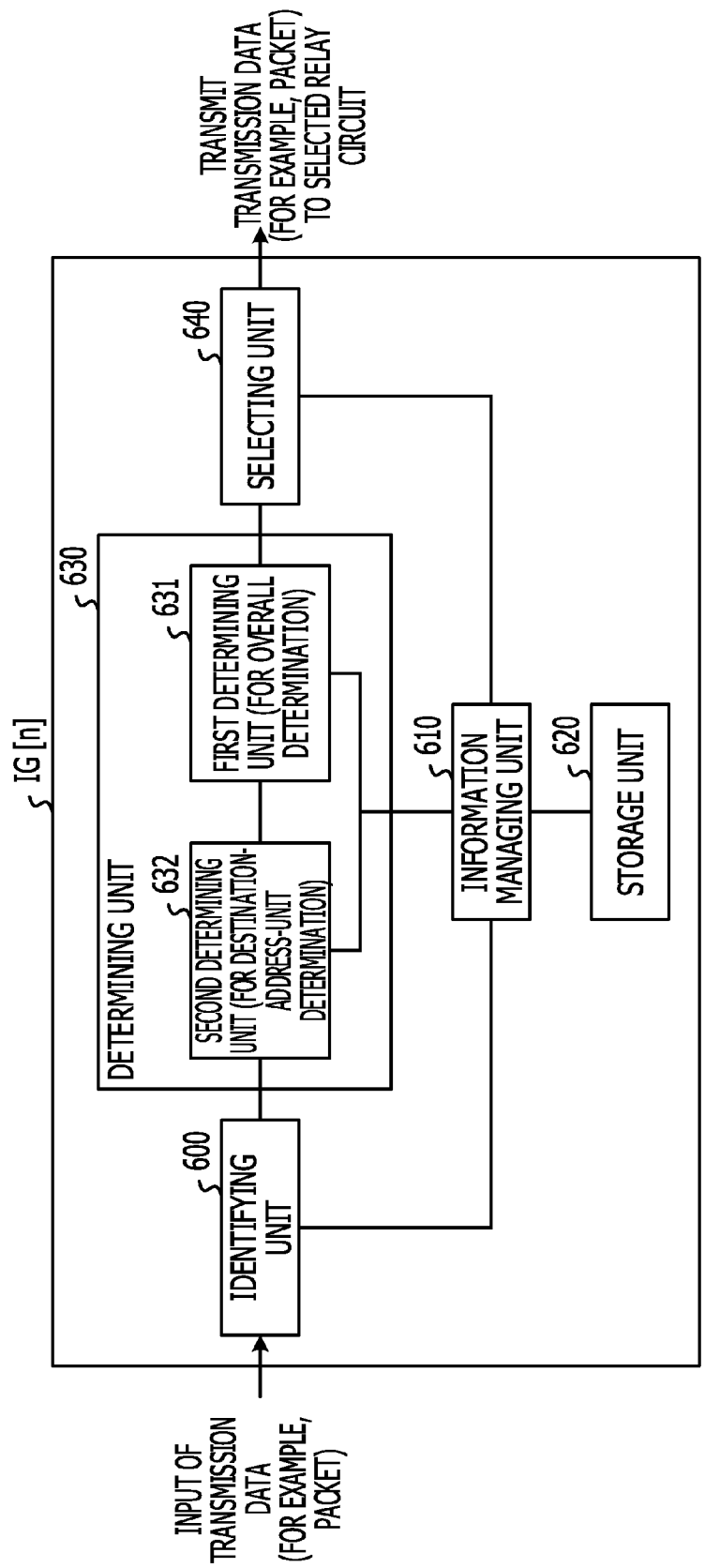
FIG. 6 illustrates an example of functional blocks of the information processing apparatus and the information processing circuit according to the embodiment.

FIG. 6 illustrates an example of functional blocks of the information processing apparatus and the information processing circuit according to the embodiment. Each of the processors 133 and 143 included in the respective NICs 130 and 140 illustrated in FIG. 1 executes a program that causes the information processing apparatus or the information processing circuit according to the embodiment to function as an identifying unit 600, an information managing unit 610, a first determining unit (for overall determination) 631, a second determining unit (for destination-address-unit determination) 632, a determining unit 630, and a selecting unit 640. A memory and a register included in the NIC 130 or 140 illustrated in FIG. 1 realize a storage unit 620. Pieces of transmission packets, such as packets, are input to the identifying unit 600, and the plurality of transmission packets, such as packets, are transmitted to a relay circuit selected by the functional blocks illustrated in FIG. 6. The processing executed by the individual functional blocks is described later in connection with processing illustrated in FIGS. 8A to 8C.

FIGS. 7A to 7C illustrate an example of information for use in the information processing apparatus and the information processing circuit according to the embodiment. The information illustrated in FIGS. 7A to 7C is stored in the storage unit 620 illustrated in FIG. 6 and is referred to by each of the processors 133 and 143 included in the respective NICs 130 and 140 illustrated in FIG. 1. A description in this case will be given in conjunction with a case in which the number of switch circuits serving as relay devices is 2 by way of example. The embodiment, however, is not limited to this example, and the number of switch circuits serving as relay devices may be any number more than 2.

FIG. 7A illustrates an example of plurality of count information for respective destination addresses (which may hereinafter be referred to as "destination-address-specific count information"). In the plurality of destination-address-specific count information, destination-address numbers (Nos.) and count values for the corresponding destination addresses are associated with each other. Each destination address number is, for example, the number of the corresponding output circuit EG[n]. The values registered as the count values are managed for each input circuit IG[n]. For example, in a case in which two switch circuits SW[0] and SW[1] serving as relay devices are provided, when a packet having the destination address EG[0] is transmitted from IG[0] to SW[0], a counter counts "−1", and when a packet having the destination address EG[0] is transmitted from IG[0] to SW[1], the counter counts "+1". The cumulative value of those values is registered in the information illustrated in FIG. 7A as the count value for IG[0]. For example, in the destination-address-specific count information illustrated in FIG. 7A, count value "+1" is registered as a cumulative value resulting from transmission of packets having the destination address EG[0] from IG[0] to SW[0] and SW[1]. The destination-address-specific count information is referred to, for example, in process 802 described below.

FIG. 7B illustrates an example of count information for the entire transmission packets (which may hereinafter be referred to as "entire-transmission-packets count information"). In the entire-transmission-packets count information, a cumulative value of switch circuits selected as the transmission destinations of packets or the like is managed for each input circuit IG[n], irrespectively of the destination addresses of the packets or the like. For example, in a case in which two switch circuits SW[0] and SW[1] serving as relay devices are provided, when packets [0], [1], ..., and [n] are transmitted from IG[0] to SW[0], a counter counts "−1", and, when packets [0], [1], ..., and [n] are transmitted from IG[0] to SW[1], the counter counts "+1", irrespectively of the destination addresses of the packets. The cumulative value of those values is then registered in the information illustrated in FIG. 7B as a count value for IG[0]. The entire-transmission-packets count information is referred to, for example, in process 807 described below.

FIG. 7C illustrates an example of sorting information according to a given rule. In the sorting information according to the given rule, destination the address numbers (Nos.) and the numbers of relay devices to be selected are associated with each other. For example, each destination address number is the number of the output circuit EG[n], and the number of each relay device to be selected is the number of the switch circuit SW[n]. The sorting information according to the given rule is also managed for each input circuit IG[n]. For example, when the given rule is a round robin system and two switch circuits SW[0] and SW[1] serving as relay devices are provided, the sorting information indicates which of the switch circuits SW[n] the input circuit IG[0] is to select is associated with the corresponding number of the output circuit EG[n]. When one switch circuit is selected in accordance with the information illustrated in FIG. 7C, the number of the switch circuit SW[n] associated with the number of the output circuit EG[n] is updated so that the same switch circuit is not continuously selected in accordance with the round robin system. The destination-address-specific count information is referred to, for example, in processes 804 and 809 described below.

Figure 8A:
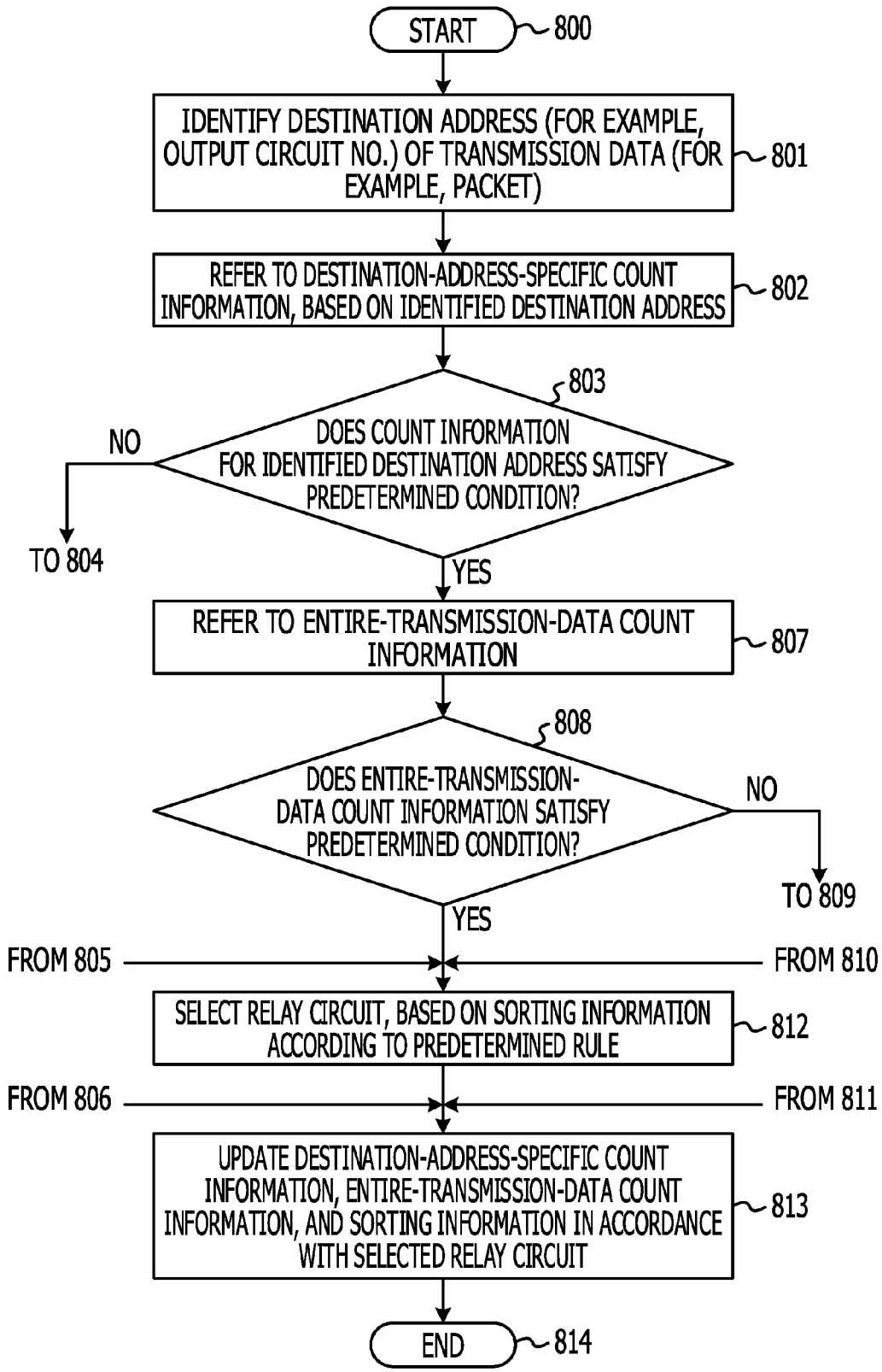

FIGS. 8A to 8C illustrate an example of the processing executed by the information processing apparatus or the information processing circuit according to the embodiment. When the information processing apparatus or the information processing circuit according to the embodiment receives plurality of transmission packets, such as packets, process 800 for initiating the processing in FIGS. 8A to 8C is executed.

The identifying unit 600 executes process 801 to identify the destination address of the transmission packets. In process 801, for example, the number of the output circuit EG[n] is identified based on the destination-address information included in the header in the transmission packets, such as a packet. When the packets processed in the communication circuit has been divided into processing units having a packets size different from that of the packets received by the communication apparatus 100, it is preferable that, in process 801, the destination address be identified based on the destination-address information attached to each of the divided plurality of packets.

Based on the identified destination address, the information managing unit 610 executes process 802 to refer to the destination-address-specific count information. The destination-address-specific count information illustrated in FIG. 7A is stored in the storage unit 620 illustrated in FIG. 6, and in process 802, the information managing unit 610 refers to the destination-address-specific count information.

The second determining unit (for destination-address-unit determination) 632 included in the determining unit 630 executes process 803 to determine whether or not the count information for the identified destination address satisfies a given condition. When it is determined that the given condition is satisfied, the process advances to process 807, and when it is determined that the given condition is not satisfied, the process advances to process 804. In process 803, based on the destination-address-specific count information illustrated in FIG. 7A, a determination is made as to whether or not the count value associated with the identified destination address satisfies the given condition. For example, when the given condition is assumed to be a case in which SW[0] or SW[1] is selected as the transmission destination two or more consecutive times, a determination is made in process 803 as to whether or not the count value is smaller than "±2". As a specific example, when the identified destination address is EG[0], it is determined in process 803 that the given condition is satisfied since the count value associated with EG[0] in FIG. 7A is "+1", which is smaller than "±2". On the other hand, when the identified destination address is EG[1], it is determined in process 803 that the given condition is not satisfied since the count value associated with EG[1] in FIG. 7A is "−2", which is not smaller than "±2". The given condition is arbitrary, and the embodiment is not limited to the above-noted numeric values; the values may be changed as appropriate.

The information managing unit 610 executes process 804 to refer to the sorting information corresponding to the identified destination address. The sorting information according to the given rule, the sorting information being illustrated in FIG. 7C, is stored in the storage unit 620 illustrated in FIG. 6, and in process 804, the information managing unit 610 refers to the sorting information according to the given rule.

The second determining unit (for destination-address-unit determination) 632 included in the determining unit 630 executes process 805 in which, when a relay circuit at a scheduled transmission destination is selected in accordance with the sorting information, the imbalance in the proportion at which the transmission destinations according to the count information for the identified destination address are selected decreases. When it is determined that the imbalance decreases, the process advances to process 812, and when it is determined that the imbalance does not decrease, the process advances to process 806. In process 805, for example, when the identified destination address is EG[1], the number of the relay circuit associated with EG[1] during the determination is referred to in the sorting information illustrated in FIG. 7C. A determination is then made as to whether or not the count value associated with EG[1] decreases when the relay circuit referred to is selected. That is, a determination is made as to whether or not selecting the relay circuit referred to causes packets having the destination address EG[1] to be continuously transmitted to the same relay device. As a result of the processing, it is determined whether or not an imbalance in the proportion at which the relay devices that serve as the transmission destinations of packets having the destination address EG[1] are selected decreases. If packets having the destination address EG[1] are not transmitted to the same relay device even when the relay device according to the sorting information is selected as the transmission destination, transmitting the packet to the relay device according to the sorting information minimizes the imbalance in the proportion at which the relay devices are selected and distributes the load of switching at the communication apparatus and the communication circuit. Thus, in such a case, the relay device according to the sorting information may be selected as the transmission destination. Conversely, if packets having the destination address EG[1] are continuously transmitted to the same relay device when the relay device according to the sorting information is selected as the transmission destination, this means that the proportion at which the relay devices are selected becomes more unbalanced, which thus does not distribute the load of switching at the communication apparatus and the communication circuit. Thus, in process 806 described below, the relay circuit that serves as the transmission destination is selected in accordance with the destination-address-specific count information to minimize the imbalance, that is, the continuous transmission to the same relay device. The expression "continuous transmission" as used in the embodiment also encompasses cases in which packets having the same destination address are continuously transmitted to a particular relay device and cases of temporally discrete continuous transmission, for example, a case in which two packets having the same destination address are continuously transmitted to the same relay device with a packet having another destination address being interposed therebetween. Settings in the given condition in process 803 may also be adjusted so that processes, such as process 805, are executed after a packet is transmitted to a scheduled transmission destination.

The selecting unit 640 executes process 806 in which the relay circuit that serves as a transmission destination is selected in accordance with the destination-address-specific count information. In process 806, in order to suppress occurrence of an imbalance in the proportion at which the communication paths are selected, the imbalance being caused by continuous selection of a particular one of the relay devices as the transmission destinations of packets having a certain destination address, the relay device is selected in accordance with the destination-address-specific count information, not the sorting information according to the given rule. For example, in a case in which the identified destination address is EG[1], when the number of the relay device associated with EG[1] during execution of the processing is SW[0] in the sorting information according to the given rule, selecting SW[0] causes the count value associated with EG[1] to change to "−3", since the count value associated therewith is "−2". This means that packets having the destination address EG[1] are continuously transmitted to SW[0], so that the proportion at which the communication paths are selected becomes unbalanced. In order to suppress the imbalance, in process 806, the relay device is selected in accordance with the sign of the count value, not the sorting information according to the given rule. For example, when the count value is negative, SW[1] is selected as a transmission destination, and when the count value is positive, SW[0] is selected as a transmission destination. For instance, since the count value associated with EG[1] during execution of the processing is "−2", SW[1] is selected as a transmission destination in accordance with the sign of the count value. As a result of the selection of SW[1], in process 813 described below, the count value associated with EG[1] is assigned "+1" and is thus updated to "−1".

The information managing unit 610 executes process 807 to refer to the entire-transmission-packets count information. The entire-transmission-packets count information illustrated in FIG. 7B is stored in the storage unit 620 illustrated in FIG. 6, and in process 807, the information managing unit 610 refers to the entire-transmission-packets count information.

The first determining unit (for overall determination) 631 included in the determining unit 630 executes process 808 in which a determination is made as to whether or not the entire-transmission-packets count information satisfies a given condition. When it is determined that the entire-transmission-packets count information satisfies the given condition, the process advances to process 812, and when it is determined that the entire-transmission-packets count information does not satisfy the given condition, the process advances to process 809. In process 808, based on the entire-transmission-packets count information illustrated in FIG. 7B, a determination is made as to whether or not the count value satisfies the given condition. For example, when the given condition is a case in which SW[0] or SW[1] is selected as a transmission destination four or more consecutive times, a determination is made in process 808 as to whether or not the count value is smaller than "±4". As a specific example, since the count value in FIG. 7B is "−4", which is not smaller than "±4", it is determined in process 808 that the count value does not satisfy the given condition. The count value not satisfying the given condition corresponds to a case in which a particular one of the relay devices is continuously selected as the transmission destinations of packets, irrespectively of the destination address of the output circuit EG[n], and the proportion at which the communication paths are selected is unbalanced as in the case described above with reference to FIG. 5. In the example in FIG. 7B, since packets have been transmitted to SW[1] four consecutive times, the proportion at which the communication paths are selected is unbalanced. The given condition is arbitrary, and the embodiment is not limited to the above-noted numeric values; the values may be changed as appropriate.

The information managing unit 610 executes process 809 in which the sorting information corresponding to the identified destination address is referred to. The sorting information according to the given rule, the sorting information being illustrated in FIG. 7C, is stored in the storage unit 620 illustrated in FIG. 6, and in process 809, the information managing unit 610 refers to the sorting information according to the given rule.

The determining unit 630 executes process 810 in which, when the relay circuit at the transmission destination scheduled is selected in accordance with the sorting information, the imbalance in the proportion at which the transmission destinations according to the entire-transmission-packets count information are selected decreases. When it is determined that the imbalance decreases, the process advances to process 812, and when it is determined that the imbalance does not decrease, the process advances to process 811. In process 810, for example, when the identified destination address is EG[1], the number of the relay circuit associated with EG[1] is referred to in the sorting information illustrated in FIG. 7C. A determination is then made as to whether or not the entire-transmission-packets count value decreases when the relay circuit referred to is selected. That is, a determination is made as to whether or not selecting the relay circuit referred to causes packets to be transmitted to the same relay device, irrespectively of the destination addresses of the packets. As a result, it is determined whether or not an imbalance in the proportion at which the relay devices that serve as the transmission destinations of the packets are selected decreases. If packets are not transmitted to the same relay device irrespectively of the destination addresses thereof even when the relay device according to the sorting information is selected as the transmission destination, transmitting the packet to the relay device according to the sorting information minimizes the imbalance in the proportion at which the relay devices are selected and distributes the load of switching at the communication apparatus and the communication circuit. In such a case, the relay device according to the sorting information may be selected as the transmission destination. Conversely, if packets are continuously transmitted to the same relay device when the relay device according to the sorting information is selected as the transmission destination, this means that the proportion at which the relay devices are selected becomes more unbalanced, which thus does not distribute the load of switching at the communication apparatus and the communication circuit. Thus, in process 811 described below, the relay circuit that serves as the transmission destination is selected in accordance with the entire-transmission-packets count information to minimize the imbalance, that is, the continuous transmission to the same relay device. The term "continuous transmission" as used in the embodiment also encompasses such cases in which packets are continuously transmitted to a particular one of the relay devices irrespectively of the destination addresses of the packets, in addition to the continuous transmission described above in conjunction with process 805. The given condition in process 808 may be adjusted so that process 810 and so on are executed after a packet is transmitted to a scheduled transmission destination.

Figure 5:
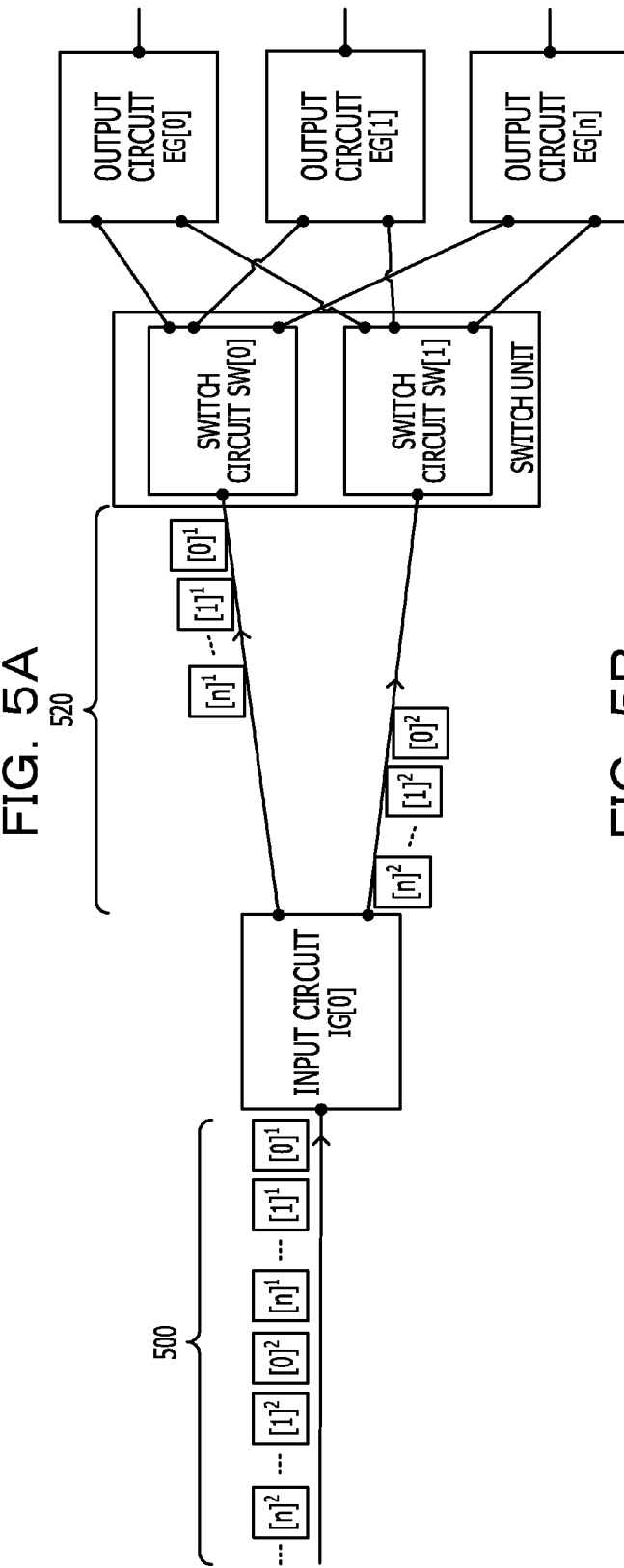
FIGS. 5A and 5B illustrate another example of plurality of transmission packets to be switched.

The selecting unit 640 executes process 811 in which a relay circuit that serves as a transmission destination is selected in accordance with the entire-transmission-packets count information. In process 811, in order to suppress occurrence of an imbalance in the proportion at which the communication paths are selected, the imbalance being caused by continuous selection of a particular one of the relay devices as the transmission destinations of packets irrespectively of the destination addresses thereof, the relay device is selected in accordance with the entire-transmission-packets count information, not the sorting information according to the given rule. For example, if SW[0] is selected as the transmission destination in accordance with the sorting information according to the given rule even though the count value associated with the entire transmission packets is "−4", then the packet is transmitted to SW[0] five consecutive times. That is, the proportion at which the communication paths are selected becomes unbalanced. In order to suppress the imbalance, in process 806, the transmission destination is selected in accordance with the sign of the count value, not the sorting information according to the given rule. For example, when the count value is a negative value, SW[1] is selected as the transmission destination, and when the count value is a positive value, SW[0] is selected as the transmission destination. For example, in this case, since the count value associated with the entire transmission packets is "−4", SW[1] is selected as the transmission destination in accordance with this sign. As a result of selection of SW[1], in process 813 described below, the count value associated with the entire transmission packets is assigned "+1" and is thus updated to "−3". This can reduce continuous transfer (as illustrated in FIG. 5) of packets to a particular one of relay devices.

The selecting unit 640 executes process 812 in which a relay circuit is selected based on the sorting information according to the given rule. Since process 812 is executed after it is determined that continuous transmission of packets is within a certain range even when the relay circuit that serves as the transmission destination of the packet is selected in accordance with the sorting information, the relay device is selected in accordance with the sorting information illustrated FIG. 7C. For example, when the identified destination address is EG[1], one of SW[0] and SW[1] associated with EG[1] is selected during execution of process 812 as the transmission destination by referring to the sorting information illustrated in FIG. 7C.

The information managing unit 610 executes process 813 in which the destination-address-specific count information, the entire-transmission-packets count information, and the sorting information are updated in accordance with the selected relay circuit. In process 813, the destination-address-specific count information illustrated in FIG. 7A, the entire-transmission-packets count information illustrated in FIG. 7B, and the sorting information illustrated in FIG. 7C are updated so as to correspond to the relay circuit selected in process 806, 811, or 812. For example, when the relay circuit selected in process 806, 811, or 812 is SW[0], the count value for the corresponding output circuit EG[n] in the destination-address-specific count information illustrated in FIG. 7A is assigned "−1", the count value in the entire-transmission-packets count information illustrated in FIG. 7B is assigned "−1", and the relay circuit in the sorting information illustrated in FIG. 7C is updated to SW[1] so that the relay circuits to be associated with the corresponding output circuit EG[n] do not continue. When the relay circuit selected in process 806, 811, or 812 is SW[1], the count value of the corresponding output circuit EG[n] in the destination-address-specific count information illustrated in FIG. 7A is assigned "+1", the count value in the entire-transmission-packets count information illustrated in FIG. 7B is assigned "+1", and the relay circuit in the sorting information illustrated in FIG. 7C is updated to SW[0] so that the relay circuits to be associated with the corresponding output circuit EG[n] do not continue. As another example, when SW[1] is selected in process 806 as the transmission destination of a packet whose identified destination address is EG[1], the count value "−2" associated with EG[1] in the destination-address-specific count information illustrated in FIG. 7A is assigned "+1" and is thus updated to "−1", the entire-transmission-packets count value "−4" illustrated in FIG. 7B is assigned "+1" and is thus updated to "−3", and the relay circuit in the sorting information illustrated in FIG. 7C is updated so that the relay circuit associated with EG[1] becomes SW[0].

Upon completion of process 813, process 814 for ending the processing illustrated in FIGS. 8A to 8C is executed.

Figures 9A, 9B:
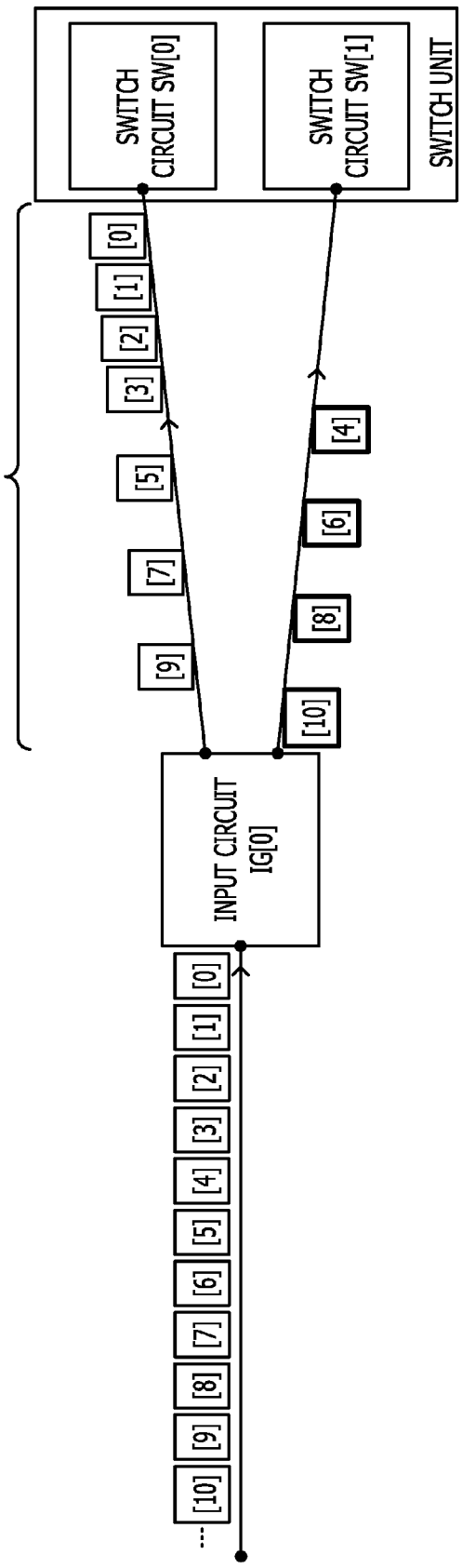
FIGS. 9A and 9B illustrate an example of communication according to the processing performed by the information processing apparatus or the information processing circuit according to the embodiment.

FIGS. 9A and 9B illustrate an example of communication according to the processing performed by the information processing apparatus or the information processing circuit according to the embodiment. In the first row in a table in FIG. 9A, an order of packets or the like input to the input circuit is indicated. In the second row, destination-address numbers are indicated so as to correspond to the order in the first row. In the third row, count values associated with the destination-address numbers in the destination-address-specific count information during determination of the transmission destinations of the packets having the destination addresses indicated in the second row are indicated so as to correspond to the order in the first row. In the fourth row, the entire-transmission-packets count values during determination of the transmission destinations of the packets having the destination addresses indicated in the second row are indicated so as to correspond to the order in the first row. In the fifth row, the numbers of the relay circuits associated with the destination-address numbers in the sorting information during determination of the transmission destinations of the packets having the destination addresses indicated in the second row are indicated so as to correspond to the order in the first row. In the sixth row, the numbers of the relay circuits selected as the transmission destinations of the packets having the destination addresses, indicated in the second row, as a result of the processing illustrated in FIGS. 8A to 8C are indicated so as to correspond to the order in the first row. FIG. 9B depicts the information, illustrated in FIG. 9A, as a series of packets.

For example, as illustrated in FIG. 9A, the destination address of the fourth input packet is EG[3], and the relay circuit selected as the transmission destination of this packet is SW[0]. This is the result of processing as follows. Since the count value associated with EG[3] during determination of the transmission destination of the packet [3] having the destination address EG[3] is "0" in the third row in FIG. 9A and is smaller than "±2", it is determined in process 803 in FIG. 8A that the given condition is satisfied. In addition, since the entire-transmission-packets count value during determination of the transmission destination of the packet [3] having the destination address EG[3] is "−3" in the fourth row in FIG. 9A and is smaller than "±4", it is determined in process 808 in FIG. 8A that the given condition is satisfied. Additionally, since the number of the relay circuit associated with EG[3] during determination of the transmission destination of the packet [3] having the destination address EG[3] is "0" in the fifth row in FIG. 9A, SW[0] is selected in process 812 in FIG. 8A in accordance with the number "0". As illustrated in FIG. 9B, in section 920, the packet [3] having the destination address EG[3] is transmitted to SW[0].

As another example, as illustrated in FIG. 9A, the destination address of the fifth input packet is EG[4], and even though the number of the relay circuit associated with EG[4] is "0" in the fifth row in FIG. 9A during determination of the transmission destination of the packet [4] having the destination address EG[4], the relay circuit selected as the transmission destination of the packet is SW[1]. This is the result of processing as follows. Since the count value associated with EG[4] during determination of the transmission destination of the packet [4] having the destination address EG[4] is "0" in the third row in FIG. 9A and is smaller than "±2", it is determined in process 803 illustrated in FIG. 8A that the given condition is satisfied, but since the entire-transmission-packets count value during determination of the transmission destination of the packet [4] having the destination address EG[4] is "−4" in the fourth row in FIG. 9A and is not smaller than "±4", it is determined in process 808 illustrated in FIG. 8A that the given condition is not satisfied, and thus process 810 is executed. In this case, the number of the relay circuit associated with EG[4] during determination of the transmission destination of the packet [4] having the destination address EG[4] is "0" in the fifth row in FIG. 9A, and thus, if the transmission destination is selected in accordance with that value "0", the entire-transmission-packets count value "−4" is assigned "−1" and becomes "−5", and thus the proportion at which the communication paths are selected becomes more unbalanced. Hence, in process 811 illustrated in FIG. 8A, SW[1] is selected based on the minus sign of the entire-transmission-packets count value "−4". As illustrated in FIG. 9B, in section 920, the packet [4] having the destination address EG[4] is transmitted to SW[1]. That is, even when the packet [4] having the destination address EG[4] is associated in the sorting information so as to be sorted to SW[0], the transmission destination is changed to SW[1] in process 811 without performing processing according to the association. As a result, the imbalance in the proportion at which the communication paths are selected is suppressed and packets continuously transmitted to SW[0] are reduced. Thus, the communication paths are proportionately selected to thereby balance the packet transmission, resulting in efficient execution of load distribution in communication. In addition, since a redundant buffer size can be reduced, the circuit scale can be reduced, thereby reducing the frequency of a back pressure and the frequency of discarding packets. Thus, it is possible to improve the communication efficiency.

FIGS. 10A to 10C illustrate an example of information updated in the processing performed by the information processing apparatus or the information processing circuit according to the embodiment. The information illustrated in FIGS. 10A to 10C is an example of the destination-addressspecific count information, the entire-transmission-packets count information, and the sorting information which are updated as a result of performing the processing illustrated in FIGS. 8A to 8C.

The information illustrated in FIG. 10A is the destination-address-specific count information updated by the information managing unit 610 after it is determined that SW[1] is to be selected as the transmission destination of the fifth packet [4] illustrated in FIG. 9A. As illustrated in FIG. 10A, as a result of sorting the packet [4] to SW[1], the count value associated with EG[4] is assigned "+1" and is thus updated from "0" to "+1".

The information is FIG. 10B is the entire-transmission-packets count information updated by the information managing unit 610 after it is determined that SW[1] is to be selected as the transmission destination of the fifth packet [4] illustrated in FIG. 9A. As illustrated in FIG. 10B, as a result of sorting the packet [4] to SW[1], the entire-transmission-packets count value is assigned "+1" and is thus updated from "−4" to "−3".

The information illustrated in FIG. 10C is the sorting information updated by the information managing unit 610 after it is determined that SW[1] is to be selected as the transmission destination of the fifth packet [4] illustrated in FIG. 9A. As illustrated in FIG. 10C, as a result of sorting the packet [4] to SW[1], SW[0] is associated with EG[4] in the sorting information. The reason is that since SW[1], not SW[0], was selected in the processing illustrated in FIGS. 8A to 8C although SW[0] was originally associated with EG[4], the number of the switch circuit associated with EG[4] in the sorting information is not changed.

Figures 11A, 11B:
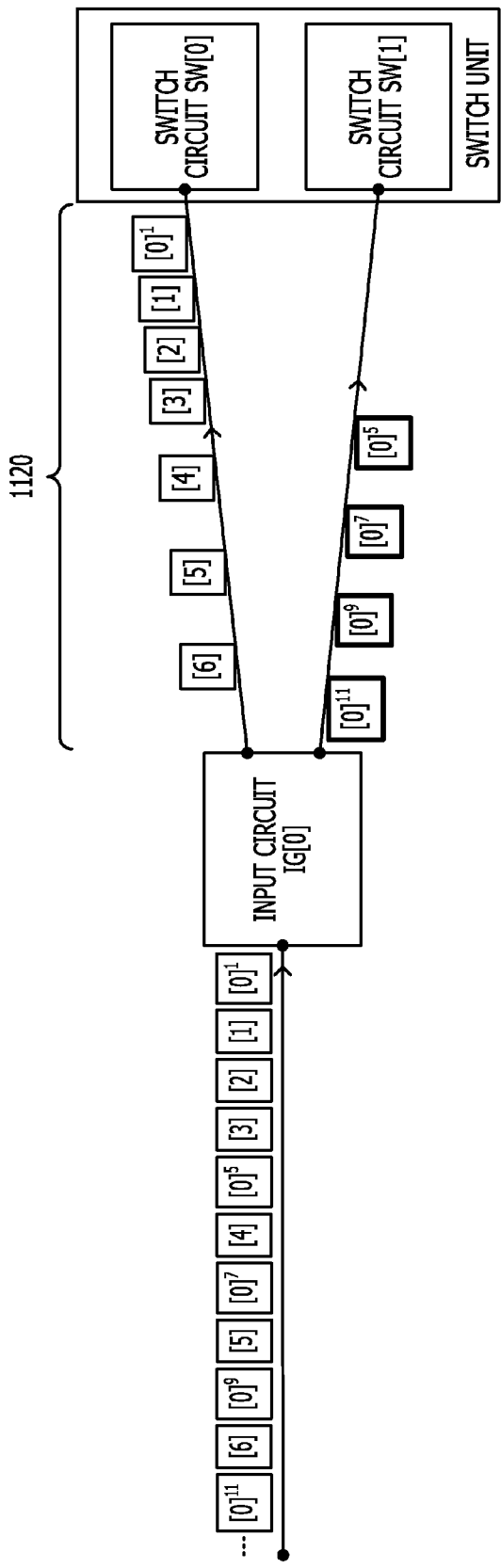
FIGS. 11A and 11B illustrate another communication example.

FIGS. 11A and 11B illustrate another communication example. In the first row in a table in FIG. 11A, an order of packets or the like input to the input circuit is indicated. In the second row, destination-address numbers are indicated so as to correspond to the order in the first row. In the third row, the entire-transmission-packets count values during determination of the transmission destinations of the packets having the destination addresses indicated in the second row are indicated so as to correspond to the order in the first row. In the fourth row, the numbers of the relay circuits associated with the destination-address numbers in the sorting information during determination of the transmission destinations of the packets having the destination addresses indicated in the second row are indicated so as to correspond to the order in the first row. In the fifth row, the numbers of the relay circuits selected as the transmission destinations of the packets having the destination addresses, indicated in the second row, as a result of the processing illustrated in FIGS. 8A to 8C are indicated so as to correspond to the order in the first row. FIG. 11B depicts the information, illustrated in FIG. 11A, as a series of packets.

An example in which, in process 811 in FIG. 8A, packets having the same destination address are continuously transmitted to a particular switch circuit, depending on the order of input packets will now be described with reference to FIGS. 11A and 11B. For example, as illustrated in FIG. 11A, the fifth input packet $[0]^5$, the seventh input packet $[0]^7$, the ninth input packet $[0]^9$, the 11th input packet $[0]^{11}$, the 13th input packet $[0]^{13}$, and so on are continuously transmitted to SW[1], so that the proportion at which the communication paths are selected becomes unbalanced.

For example, as illustrated in FIG. 11A, the destination address of the fifth input packet $[0]^5$ is EG[0], and the entire-transmission-packets count value is "−4" during determination of the transmission destination of the packet $[0]^5$ having the destination address EG[0] is "−4" in the third row in FIG. 11A and is not smaller than "±4". In this case, the number of the relay circuit associated with EG[0] during determination of the transmission destination of the packet $[0]^5$ having the destination address EG[0] is "1" in the fourth row in FIG. 11A. Thus, even when the transmission destination is selected in accordance with the number "1" of the relay circuit, the entire transmission-packets count value "−4" is assigned "+1" and thus becomes "−3". As a result, the imbalance in the proportion at which the communication paths are selected is suppressed. Thus, SW[1] is selected as the transmission destination of the packet $[0]^5$ having the destination address EG[0].

As another example, as illustrated in FIG. 11A, the destination address of the seventh input packet is EG[0], and the entire-transmission-packets count value during determination of the transmission destination of the packet $[0]^7$ having the destination address EG[0] is "−4" in the third row in FIG. 11A and is not smaller than "±4". In this case, although the number of the relay circuit associated with EG[0] during determination of the transmission destination of the packet $[0]^7$ having the destination address EG[0] is "0" in the fourth row in FIG. 11A, the relay circuit selected as the transmission destination of the packet $[0]^7$ having the destination address EG[0] is SW[1]. This is because, if the relay circuit is selected in accordance with the sorting information, then SW[0] is selected, the entire-transmission-packets count value "−4" is assigned "−1" and becomes "−5", and the proportion at which the communication paths are selected becomes more unbalanced. Accordingly, SW[1] is selected based on the minus sign of the entire-transmission-packets count value "−4".

However, as also illustrated in FIG. 11B, in section 1120, the packet $[0]^7$ having the destination address EG[0] is transmitted to SW[1] subsequent to EG[0]$^5$. Similarly, the packets $[0]^9$, $[0]^{11}$, $[0]^{13}$, and so on are transmitted to SW[1]. In such a manner, depending on the order of input packets, packets having a particular destination address are disproportionately transmitted to a particular relay circuit. Although the above description has been given of an example in which the packets having the destination address EG[0] are continuously transmitted from IG[0] to SW[1], there are also cases in which the packets having the destination address EG[0] are also continuously transmitted from another IG[n] to SW[1] at the same time. In such cases, a number of packets exceeding a permissible number may be input to SW[1] to cause congestion.

FIGS. 12A and 12B illustrate an example of information updated in connection with the other communication example in FIGS. 11A and 11B. The information illustrated in FIGS. 12A and 12B is another example of the entire-transmission-packets count information and the sorting information which are updated in connection with the other communication example in FIGS. 11A and 11B.

The information illustrated in FIG. 12A is the entire-transmission-packets count information updated after it is determined that SW[1] is to be selected as the transmission destination of the seventh packet $[0]^7$ illustrated in FIG. 11A. As illustrated in FIG. 12A, as a result of sorting the packet $[0]^7$ to SW[1], the entire-transmission-packets count value is assigned "+1" and is thus updated from "−4" to "−3".

The information illustrated in FIG. 12B is the sorting information updated after it is determined that SW[1] is to be selected as the transmission destination of the seventh packet $[0]^7$ illustrated in FIG. 11A. As illustrated in FIG. 12B, as a result of sorting the packet $[0]^7$ to SW[1], EG[0] is associated with SW[0] in the sorting information. This is because, since SW[1], not SW[0], was selected in the processing illustrated in FIGS. 8A to 8C although SW[0] was originally associated with EG[0], the number of the switch circuit associated with EG[0] in the sorting information is not changed.

Figures 13A, 13B:
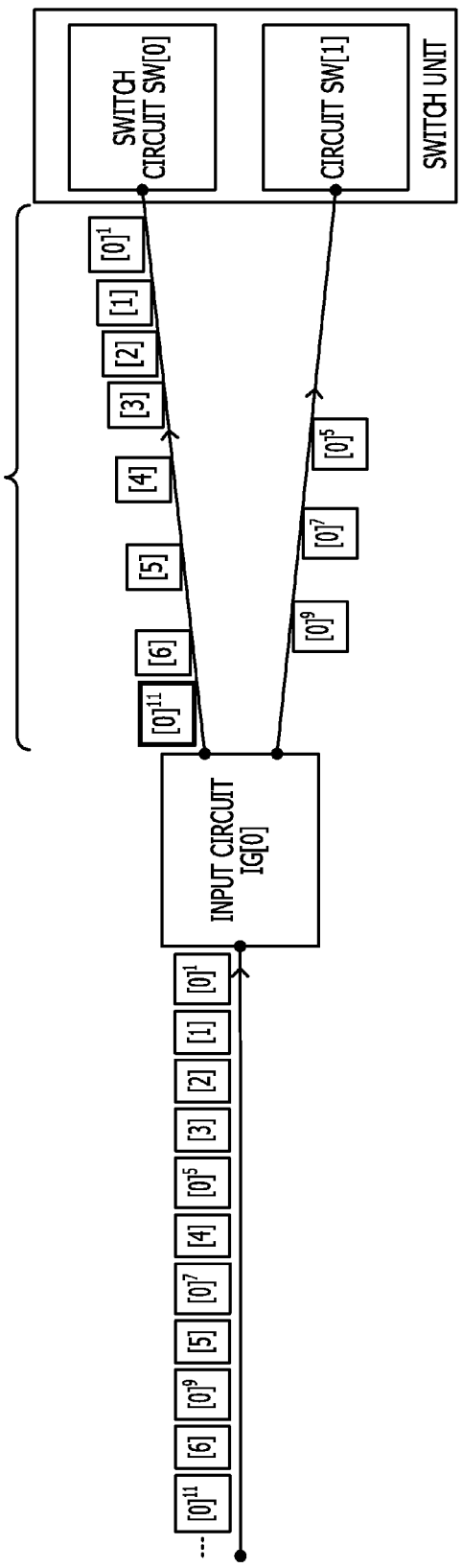
FIGS. 13A and 13B illustrate another communication example according to the processing performed by the information processing apparatus or the information processing circuit according to the embodiment.

FIGS. 13A and 13B illustrate another communication example according to the processing performed by the information processing apparatus or the information processing circuit according to the embodiment. In the first row in a table in FIG. 13A, an order of packets or the like input to the input circuit is indicated. In the second row, destination address numbers are indicated so as to correspond to the order in the first row. In the third row, count values associated with the destination address numbers in the destination-address-specific count information during determination of the transmission destinations of the packets having the destination addresses indicated in the second row are indicated so as to correspond to the order in the first row. In the fourth row, the entire-transmission-packets count values during determination of the transmission destinations of the packets having the destination addresses indicated in the second row are indicated so as to correspond to the order in the first row. In the fifth row, the numbers of the relay circuits associated with the destination address numbers in the sorting information during determination of the transmission destinations of the packets having the destination addresses indicated in the second row are indicated so as to correspond to the order in the first row. In the sixth row, the numbers of the relay circuits selected as the transmission destinations of the packets having the destination addresses, indicated in the second row, as a result of the processing illustrated in FIGS. 8A to 8C are indicated so as to correspond to the order in the first row. FIG. 13B depicts the information, illustrated in FIG. 13A, as a series of packets. In FIG. 13B, the order of the series of packets input to IG[0] is illustrated as being the same as the order illustrated in FIG. 11B.

For example, the destination address of the ninth input packet is $EG[0]^9$ as illustrated in FIG. 13A, and the count value associated with EG[0] during determination of the transmission destination of the packet $[0]^9$ having the destination address EG[0] is "+1" in the third row in FIG. 13A and is smaller than "±2". Thus, it is determined in process 803 in FIG. 8A that the given condition is satisfied, and the entire-transmission-packets count value during determination of the transmission destination of the packet $[0]^9$ having the destination address EG[0] is "−4" in the fourth row in FIG. 13A and is not smaller than "±4". Thus, it is determined in process 808 illustrated in FIG. 8A that the given condition is not satisfied, and process 810 is executed. In this case, although the number of the relay circuit associated with EG[0] during determination of the transmission destination of the packet $[0]^9$ having the destination address EG[0] is "0" in the fifth row in FIG. 13A, the relay circuit selected as the transmission destination of the packet $[0]^9$ having the destination address EG[0] is SW[1]. This is because, if the relay circuit is selected in accordance with the sorting information, then SW[0] is selected, the entire-transmission-packets count value "−4" is assigned "−1" and becomes "−5", and thus it is determined in process 810 illustrated in FIG. 8A that the proportion at which the communication paths are selected becomes more unbalanced. Accordingly, process 811 illustrated in FIG. 8A is executed, so that SW[1] is selected based on the minus sign of the entire-transmission-packets count value "−4". As a result, as illustrated in section 1320 in FIG. 13B, the packets $EG[0]^5$, $EG[0]^7$, and $EG[0]^9$ are continuously transmitted to SW[1].

As another example, as illustrated in FIG. 13A, the destination address of the 11th input packet is $EG[0]^{11}$, and the relay circuit selected as the transmission destination of the 11th input packet is SW[0]. This is because, since the count value associated with EG[0] during determination of the transmission destination of the packet $[0]^{11}$ having the destination address $EG[0]^{11}$ is "+2" in the third row in FIG. 13A and is not smaller than "±2", it is determined in process 803 illustrated in FIG. 8A that the given condition is not satisfied and process 805 is thus executed. In this case, the number of the relay circuit associated with EG[0] during determination of the transmission destination of the packet $[0]^{11}$ having the destination address $EG[0]^{11}$ is "0" in the fifth row in FIG. 13A. Thus, even when the transmission destination is selected in accordance with the number "0" of the relay circuit, the count value "+2" associated with EG[0] is assigned "−1" and becomes "+1", and thus it is determined in process 805 that the imbalance in the proportion at which the communication paths are selected is suppressed. Thus, in process 810 illustrated in FIG. 8A, it is also determined that the imbalance is reduced. Thereafter, in process 812 illustrated in FIG. 8A, SW[1] is selected as the transmission destination of the packet $[0]^{11}$ having the destination address $EG[0]^{11}$. This is an example in which although the entire-transmission-packets count value is "−4", the relay circuit is selected without performing the processing according to the entire-transmission-packets count value "−4". As a result, as illustrated in FIG. 13B, the packet $[0]^{11}$ having the destination address $EG[0]^{11}$ is transmitted to SW[0], unlike the case in FIG. 11B. This results in suppression of continuous transmission of packets having the destination address EG[0] to SW[1]. That is to say, depending on the input order of packets, an imbalance in the proportion at which the communication paths are selected is suppressed through changing of the transmission destinations when packets having a particular destination address are disproportionately transmitted to a particular relay circuit.

As described above, according to the embodiment, the communication paths are proportionately selected to thereby balance the packet transmission, resulting in efficient execution of load distribution in communication. In addition, since the redundant buffer size can be reduced, the circuit scale can be reduced, thereby reducing the frequency of a back pressure and the frequency of discarding packets. Thus, it is possible to improve the communication efficiency. The buffer size for redundancy is a size that may be exceeded by packets that are continuously transmitted even when interchanging the order of packets is scheduled. According to the embodiment, even with such a size, since the continuous transmission is reduced through changing of the transmission destinations of packets, communication can be maintained without overflow of packets stored in the buffer.

FIGS. 14A to 14C illustrate another example of information for communication according to the processing performed by the communication apparatus or the communication circuit according to the embodiment. The information illustrated in FIGS. 14A to 14C is another example of the destination-address-specific count information, the entire-transmission-packets count information, and the sorting information which are updated as a result of performing the processing illustrated in FIGS. 8A to 8C.

The information illustrated in FIG. 14A is the destination-address-specific count information updated by the information managing unit 610 after it is determined that SW[0] is to be selected as the transmission destination of the 11th packet $[0]^{11}$ illustrated in FIG. 13A. As illustrated in FIG. 14A, as a result of sorting the packet $[0]^{11}$ to SW[0], the count value associated with EG[0] is assigned "−1" and is updated from "+2" to "+1".

Information illustrated in FIG. 14B is the entire-transmission-packets count information updated by the information managing unit 610 after it is determined that SW[0] is to be selected as the transmission destination of the 11th packet [0]$^{11}$ illustrated in FIG. 13A. As illustrated in FIG. 14B, as a result of sorting the packet [0]$^{11}$ to SW[0], the entire-transmission-packets count value is assigned "−1" and is thus updated from "−4" to "−5".

Information illustrated in FIG. 14C is the sorting information updated by the information managing unit 610 after it is determined that SW[0] is to be selected as the transmission destination of the 11th packet [0]$^{11}$ illustrated in FIG. 13A. As illustrated in FIG. 14C, as a result of the sorting of the packet [0]$^{11}$ to SW[0], SW[1] is associated with EG[0] in the sorting information. This is because, since SW[0] was selected in the processing illustrated in FIGS. 8A to 8C although SW[0] was originally associated with EG[0], the number of the switch circuit associated with EG[0] in the sorting information has been changed.

Figure 15:
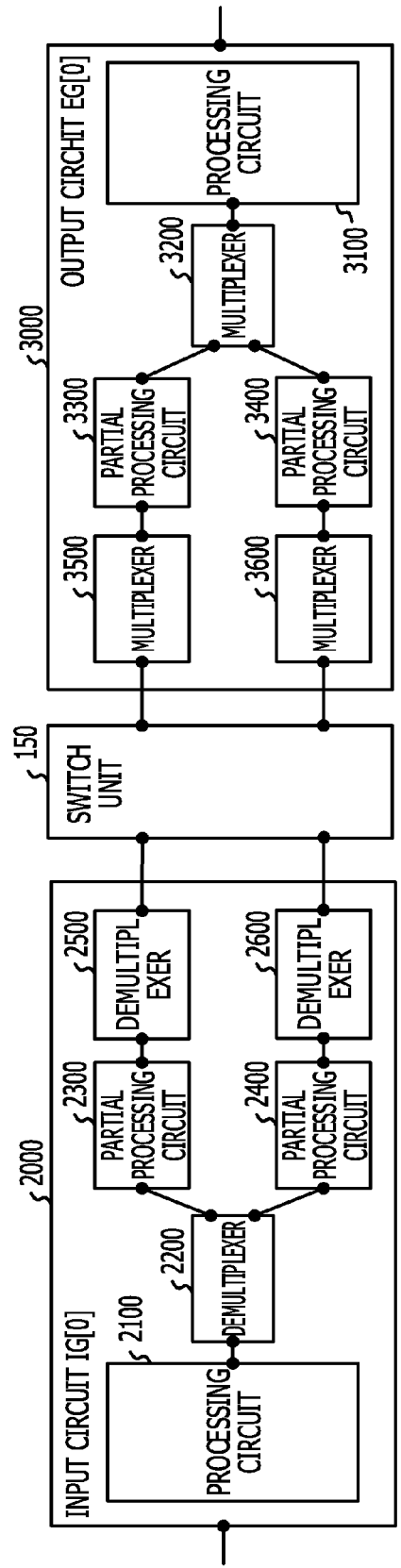
FIG. 15 illustrates another example of the information processing apparatus and the information processing circuit according to the embodiment.

FIG. 15 illustrates another example of the information processing apparatus and the information processing circuit according to the embodiment. In the example of the information processing apparatuses illustrated in FIG. 15, an input circuit 2000 and a demultiplexer 2200 are examples of the information processing circuits. Data, such as packets, input to the input circuit 2000 are processed by a processing circuit 2100. Data output from a processing circuit 2100 are (time) divided by the demultiplexer 2200 and the resulting packets are input to partial processing circuits 2300 and 2400. For example, when the communication speed of packets, such as packets, input to the input circuit 2000 is high, internal processes, such as packet identification for maintaining the quality of communication, are not completed in time. Thus, in order to perform the processes in a parallel manner the partial processing circuits 2300 and 2400 are used. Then, the packets processed by the partial processing circuits 2300 and 2400 are transmitted to the switch unit 150 via demultiplexers 2500 and 2600. The switch unit 150 performs switching based on the destination addresses, as described above, and transmits the packets to a partial processing circuit 3300 or 3400, included in an output circuit 3000, via a multiplexer 3500 or 3600 in accordance with the destination address of each piece of packets. Data output from the partial processing circuits 3300 and 3400 are multiplexed by a multiplexer 3200 and the multiplexed packets is input to a processing circuit 3100. Then, the packets, such as packets, are transmitted from the processing circuit 3100 to a given destination address.

When the demultiplexer 2200 disproportionately sorts the packets, output from the processing circuit 2100, to the partial processing circuits 2300 and 2400, the proportion at which the transmission paths of the packets are selected becomes unbalanced as described above with reference to FIG. 3, FIGS. 5A and 5B, or FIGS. 11A and 11B. Accordingly, during sorting of the packets in order to enable parallel processing as illustrated in FIG. 15, the functional blocks in FIG. 6 and the processing in FIGS. 8A to 8C may be employed so that the proportion at which the transmission paths are selected does not become unbalanced. In such a case, since the sizes of redundant buffers provided in the partial processing circuits 2300 and 2400 may be reduced, the circuit scale can be reduced, and the frequency of applying a back pressure or discarding packets is reduced. Thus, it is possible to achieve a transmission efficiency corresponding to the throughput at the speed of communication input to the input device 2000.

The above-described embodiment is directed to an example of the information processing apparatus and the information processing circuit and is not limited thereto. Thus, for implementation of the present disclosure, peripheral configurations of the information processing apparatus and the information processing circuit may also be changed or modified as appropriate.

Figure 16:
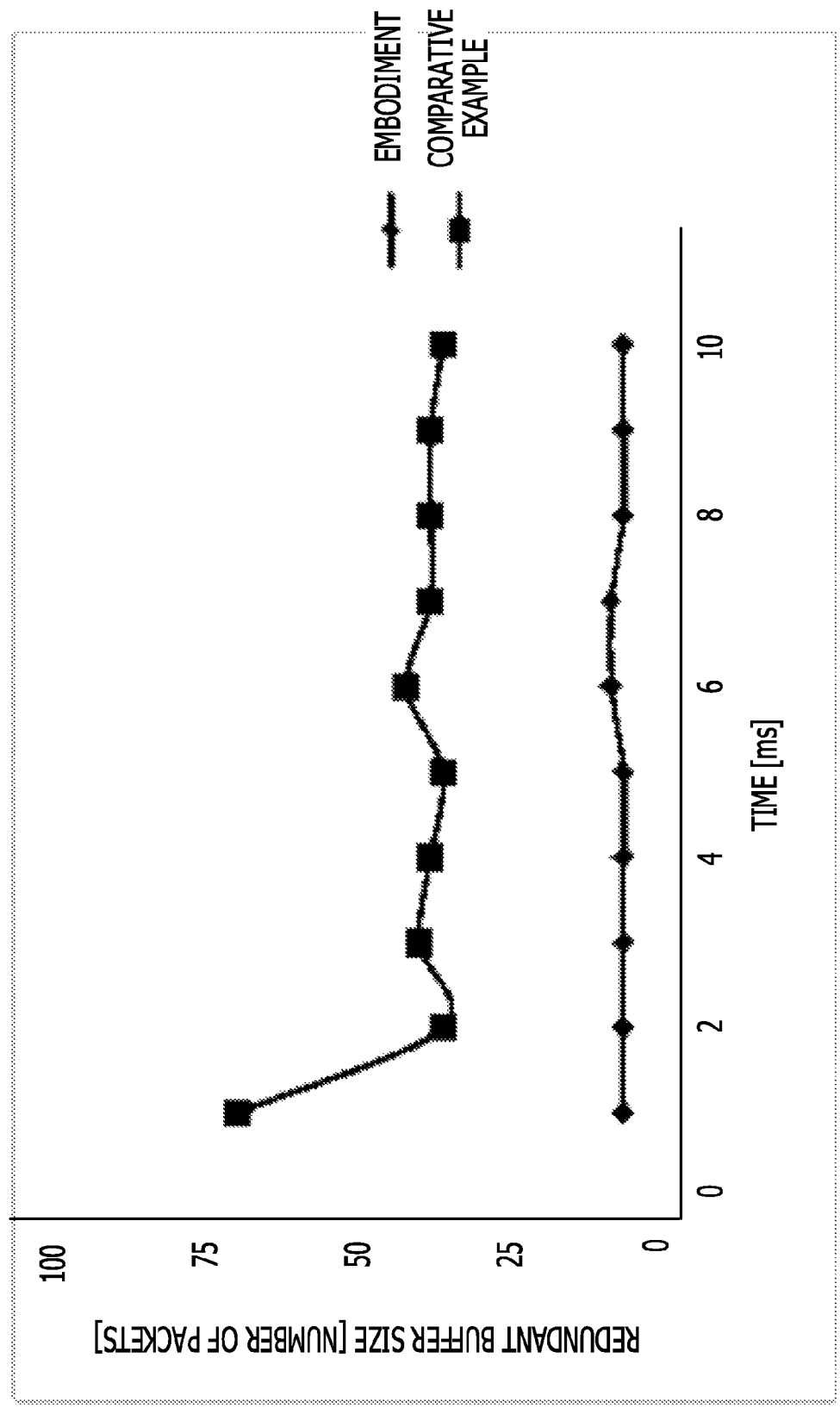
FIG. 16 illustrates an example of a simulation result related to the information processing apparatus and the information processing circuit according to the embodiment.

FIG. 16 illustrates an example of a simulation result related to the information processing apparatus and the information processing circuit according to the embodiment. In this simulation, temporal changes in the number of packets continuously transmitted when the destination addresses of input packets were randomly changed were estimated with respect to the information processing apparatus and the information processing circuit according to the embodiment. In FIG. 16, the number of packets continuously transmitted when packets whose destination addresses are randomly changed are sorted to switch circuits in accordance with a round robin system are plotted as squares. On the other hand, the number of packets continuously transmitted when packets are sorted according to the embodiment are plotted as rhombi. According to the embodiment, as illustrated in FIG. 16, it is possible to reduce the number of packets that are continuously transmitted. Thus, the use of the information processing apparatus or the information processing circuit according to the embodiment makes it possible to reduce the size of each redundant buffer for temporarily storing packets that are continuously transmitted.

According to the above-described embodiment, in order to ensure that plurality of packets to be transmitted to different destination addresses under a given rule that causes plurality of packets having the same destination address to pass through different relay circuits are not disproportionately transmitted to a particular one of the relay circuits, packets scheduled to be transmitted are transmitted to another relay circuit. This suppresses disproportionate transmission of packets to a particular relay circuit. For example, continuous transmission of packets to a particular relay circuit is suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A packet transmitting method using an input circuit and a plurality of relay devices coupled to the input circuit through a plurality of paths, the method comprising:

receiving, by the input circuit, a first packet group including a plurality of packets, each of which has a same destination address;

receiving, by the input circuit, a second packet group including a plurality of packets, each of which has a same destination address;

selecting a relay device from among the plurality of relay devices based on a first rule that rules a round robin manner for each of the plurality of packets included in the first packet group, and transmitting each of the plurality of packets included in the first packet group to the selected relay device through the plurality of paths, respectively;

selecting a relay device among the plurality of relay devices based on a second rule that rules the round robin manner for each of the plurality of packets included in the second packet group, and transmitting each of the plurality of packets included in the second packet group to the selected relay device through the plurality of paths, respectively;

counting a difference between a first number and a second number, the first number indicating a number of packets transmitted to a first relay device included in the plurality of relay devices through a first path included in the plurality of paths, and the second number indicating a number of packets transmitted to a second relay device included in the plurality of relay devices through a second path included in the plurality of paths;

when the first number is higher than the second number and the difference between the first number and the second number reaches a predetermined value, selecting the second relay device regardless of whether the first relay device is to be selected based on the first rule; and transmitting the first packet group to the second relay device through the second path.

2. The method according to claim 1, further comprising:
determining whether a plurality of packets are disproportionately transmitted through the first path based on a number of packets continuously transmitted or to be continuously transmitted to the first relay device using the first path.

3. The method according to claim 1, further comprising:
when the first packet group is transmitted through the second path and the first packet group and another packet are continuously transmitted through the second path, transmitting the other packet though a third path included in the plurality of paths.

4. The method according to claim 1, further comprising:
determining whether a plurality of packets are disproportionately transmitted through the first path based on a remaining capacity of a receiving buffer included in the first relay device, and
when the plurality of packets are disproportionately transmitted in the first path, selecting the second relay device as the destination device of the first packet regardless of whether the first relay device is to be selected based on the first rule.

5. An apparatus comprising:
a first relay device;
a second relay device;
an input circuit coupled to the first relay device and the second relay device through a plurality of paths, the input circuit receiving a first packet group including a plurality of packets, each of which has a same destination address, and receiving a second packet group including a plurality of packets, each of which has a same destination address; and
a processor configured to:
select a relay device from among the plurality of relay devices based on a first rule that rules a round robin manner for each of the plurality of packets included in the first packet group, and transmit each of the plurality of packets included in the first packet group to the selected relay device through the plurality of paths, respectively;
select a relay device among the plurality of relay devices based on a second rule that rules the round robin manner for each of the plurality of packets included in the second packet group, and transmit each of the plurality of packets included in the second packet group to the selected relay device through the plurality of paths, respectively;
count a difference between a first number and a second number, the first number indicating a number of packets transmitted to a first relay device included in the plurality of relay devices through a first path included in the plurality of paths, and the second number indicating a number of packets transmitted to a second relay device included in the plurality of relay devices through a second path included in the plurality of paths;
when the first number is higher than the second number and the difference between the first number and the second number reaches a predetermined value, select the second relay device regardless of whether the first relay device is to be selected based on the first rule; and
transmit the first packet group to the second relay device through the second path.

6. An apparatus including a first relay device, a second relay device, and an input circuit coupled to the first relay device and the second relay device through a plurality of paths, the input circuit receiving a first packet group including a plurality of packets, each of which has a same destination address, and receiving a second packet group including a plurality of packets, each of which has a same destination address, the apparatus comprising:
a memory configured to store a program; and
a processor coupled to the memory and configured to
select a relay device from among the plurality of relay devices based on a first rule that rules a round robin manner for each of the plurality of packets included in the first packet group, and transmit each of the plurality of packets included in the first packet group to the selected relay device through the plurality of paths, respectively;
select a relay device among the plurality of relay devices based on a second rule that rules the round robin manner for each of the plurality of packets included in the second packet group, and transmit each of the plurality of packets included in the second packet group to the selected relay device through the plurality of paths, respectively;
count a difference between a first number and a second number, the first number indicating a number of packets transmitted to a first relay device included in the plurality of relay devices through a first path included in the plurality of paths, and the second number indicating a number of packets transmitted to a second relay device included in the plurality of relay devices through a second path included in the plurality of paths;
when the first number is higher than the second number and the difference between the first number and the second number reaches a predetermined value, select the second relay device regardless of whether the first relay device is to be selected based on the first rule; and
transmit the first packet croup to the second relay device through the second path.

* * * * *